United States Patent
Yang et al.

(10) Patent No.: US 10,728,904 B2
(45) Date of Patent: Jul. 28, 2020

(54) INFORMATION TRANSMISSION METHOD AND DEVICE, AND STORAGE MEDIUM

(71) Applicant: ZTE CORPORATION, Shenzhen (CN)

(72) Inventors: Xun Yang, Shenzhen (CN); Bo Dai, Shenzhen (CN); Jianqiang Dai, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/301,164

(22) PCT Filed: May 10, 2017

(86) PCT No.: PCT/CN2017/083820
§ 371 (c)(1),
(2) Date: Nov. 13, 2018

(87) PCT Pub. No.: WO2017/193942
PCT Pub. Date: Nov. 16, 2017

(65) Prior Publication Data
US 2019/0313417 A1 Oct. 10, 2019
US 2020/0092892 A9 Mar. 19, 2020

(30) Foreign Application Priority Data

May 13, 2016 (CN) .......................... 2016 1 0322443
Nov. 4, 2016 (CN) .......................... 2016 1 0965396

(51) Int. Cl.
*H04W 72/04* (2009.01)
*H04W 72/08* (2009.01)
(Continued)

(52) U.S. Cl.
CPC ......... *H04W 72/082* (2013.01); *H04L 5/0062* (2013.01); *H04L 5/0091* (2013.01);
(Continued)

(58) Field of Classification Search
CPC .. H04W 72/042; H04W 72/082; H04W 88/02
(Continued)

(56) References Cited

U.S. PATENT DOCUMENTS

2010/0046644 A1 2/2010 Mazet
2013/0077578 A1 3/2013 Wang
(Continued)

FOREIGN PATENT DOCUMENTS

CN 101627583 A 1/2010
CN 101801078 A 8/2010
(Continued)

OTHER PUBLICATIONS

International Search Report in the international application No. PCT/CN2017/083820, dated Aug. 11, 2017, 2 pgs.
(Continued)

Primary Examiner — Lee Nguyen
(74) Attorney, Agent, or Firm — Cantor Colburn LLP

(57) ABSTRACT

Provided is an information transmission method, including that: a base station acquires indication information for a target terminal and sends the indication information to the target terminal; and the target terminal receives the indication information from the base station, and cancels interference based on the indication information during data reception of multi-user superposition. Also an information transmission device and a storage medium are provided.

15 Claims, 8 Drawing Sheets

Indication information for a target terminal is acquired — 101

The indication information is sent to the target terminal to enable the target terminal to cancel interference based on the indication information during data reception of multi-user superposition — 102

(51) Int. Cl.
*H04L 5/00* (2006.01)
*H04W 72/12* (2009.01)
*H04W 88/02* (2009.01)

(52) U.S. Cl.
CPC ......... *H04W 72/04* (2013.01); *H04W 72/042* (2013.01); *H04L 5/0005* (2013.01); *H04L 5/0037* (2013.01); *H04L 5/0051* (2013.01); *H04L 5/0053* (2013.01); *H04W 88/02* (2013.01)

(58) Field of Classification Search
USPC ..................................................... 455/114.2
See application file for complete search history.

(56) References Cited

U.S. PATENT DOCUMENTS

| 2014/0153499 | A1 | 6/2014 | Wang et al. | |
| 2014/0362769 | A1* | 12/2014 | Chen | H04J 11/0053 370/328 |
| 2015/0208428 | A1 | 7/2015 | Park et al. | |
| 2016/0100390 | A1 | 4/2016 | Kuo | |
| 2017/0222671 | A1* | 8/2017 | Jin | H04L 29/08 |

FOREIGN PATENT DOCUMENTS

| CN | 104247282 | A | 12/2014 |
| CN | 105491556 | A | 4/2016 |
| CN | 106452537 | A | 2/2017 |
| WO | 2017021771 | A2 | 2/2017 |

OTHER PUBLICATIONS

English Translation of the Written Opinion of the International Search Authority in the international application No. PCT/CN2017/083820, dated Aug. 11, 2017, 7 pgs.

Nokia Networks: "Network assistance for MUST", Nov. 2015; 3GPP TSG-RAM Wg 1 Meeting #83; RI-157238, 3rd Generation Partnership Project (#GPP); Mobile Competence Centre; vol. RAN WG1, 4 pgs.

Fiberhome:"Consideration on Control Signaling of MUST", May 2016; 3GPP TSG RAN WG1 #85; R1-164345, 3rd Generation Partnership Project (#GPP); Mobile Competence Centre; vol. RAN WG1; vol. RAN WG1, China; 3 pgs.

Nokia Networks :"Further link performance analysis of Must schemes", Nov. 2015; 3GPP TSG-RAN WG1 Meeting #83; R1-157236, 3rd Generation Partnership Project (#GPP); Mobile Competence Centre; vol. RAN WG1; vol. RAN WG1, China; 7 pgs.

Supplementary European Search Report in the European application No. 17795560.6, dated Mar. 21, 2019, 9 pgs.

Sequans Communications: "On Signaling Alternatives for MUST", Aug. 2015; 3GPP TSG RAN WG1 Meeting #82, R1-154023, China, 4 pgs.

"Bits-to-Symbol Mappings for Superposition Coding Based HARQ Systems"; 2013; Chaitanya Tumula V.K. and Erik Larsson, Proceedings of the IEEE Wireless communications and Networking conference (WCNC), 6 pgs.

"Hierarchically Modulated Network Coding for Asymmetric Two-Way Relay Systems", Jun. 2010; Jung Min Park, Seong-Lyun Kim and Jinho Choi; IEEE Transactions on Vehicular Technology, vol. 59, No. 5, 6 pgs.

"Multiplexing and channel coding"; Sep. 2016; 3GPP TS 36.212 V14.0.0; 3rd Generation Partnership Project; Technical Specification Group Radio Access Network; Evolved Universal Terrestrial Radio Access (E-UTRA); 148 pgs.

"On signaling design for Must case 3"; Oct. 2016; 3GPP TSG RAN WG1 Meeting #86bis; R1-1609293; Portugal, 7 pgs.

"WF on Signaling Design for Must Case 3"; Nov. 2016; 3GPP TSG-RAN WG1 #87; R1-16113616; MediaTek, CMCC, III, ITRI, Huawei, HiSilicon; USA, 4 pgs.

Discussion on Remaining Issues of Signaling for MUST; Nov. 2016; 3GPP TSG RAN WG1 Meeting #87; R1-1611298; ATE, ATE Microelectronics, USA, 3 pgs.

* cited by examiner

FIG. 12
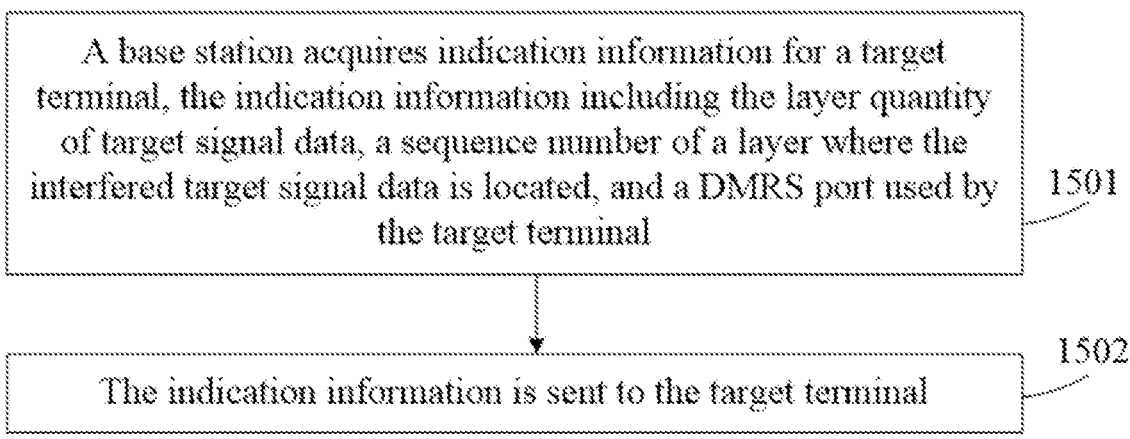
FIG. 13
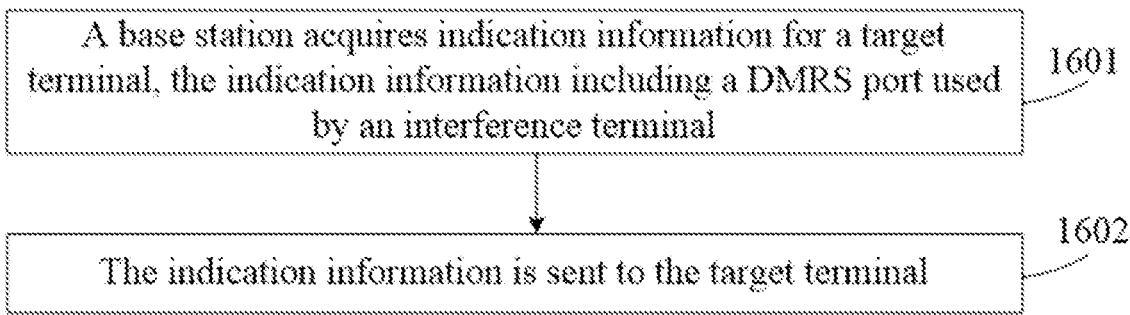
FIG. 14

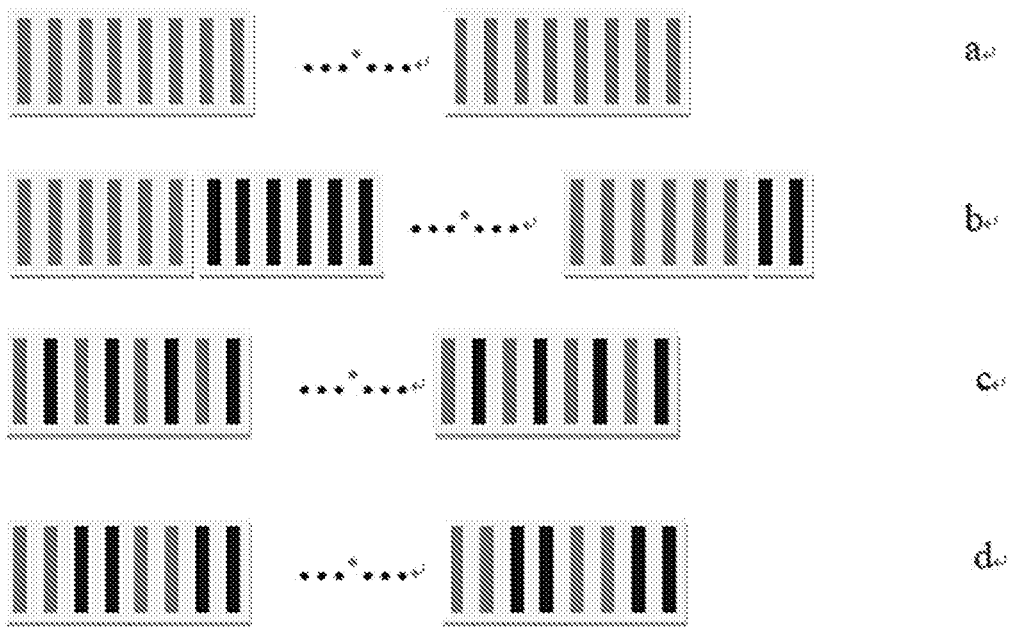

FIG. 16

| A PMI used by a target signal, a rank used by the target signal, a storage sequence number of a PMI used by an interference signal, and a first information comparison table used by the target signal are acquired | 1801 |
|---|---|
| The first information comparison table is searched for on the basis of a storage sequence number of a PMI used by an interference signal, the PMI used by the target signal and the rank used by the target signal, so as to obtain the PMI used by the interference signal | 1802 |

FIG. 17

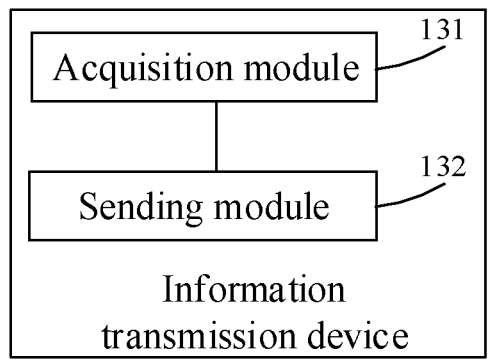

FIG. 18

INFORMATION TRANSMISSION METHOD AND DEVICE, AND STORAGE MEDIUM

CROSS-REFERENCE TO RELATED APPLICATIONS

The present application claims benefit of Chinese Patent Application No. 201610322443.1, filed on May 13, 2016, and Chinese Patent Application No. 201610965396.2, filed on Nov. 4, 2016, the contents of which are hereby incorporated by reference in their entirety.

TECHNICAL FIELD

The disclosure relates to the technical field of wireless communications, and in particular to an information transmission method and device, and a storage medium.

BACKGROUND

A Non-Orthogonal Multiple Access (NOMA), one of the key potential technologies of the 5th-Generation (5G) mobile communication technology, has significant advantages in improving spectral efficiency. The principle of NOMA is that a transmitting side performs multi-user information superposition coding and a receiving side uses Successive Interference Cancellation (SIC).

Multi-User Superposition Transmission (MUST) developed based on the NOMA technology is an important part of 5G research of an international standard organization 3GPP. In the research, it is found that enabling a receiving terminal to obtain necessary known information as much as possible is critical for the receiving terminal to cancel interference and improve the correct demodulation rate. However, the existing Physical Downlink Control Channel (PDCCH) control signaling cannot effectively indicate MUST parameters, which brings difficulties to the performance improvement of a MUST system.

Therefore, it is urgent to provide an information transmission scheme that enables a receiving terminal to acquire information required for interference cancellation and improve the interference cancellation performance of a MUST system.

SUMMARY

In view of this, embodiments of the disclosure are directed to an information transmission method and device, and a storage medium, which at least solve the problems in the existing art, and enable a target terminal to receive information required for interference cancellation with less overhead. The interference cancellation performance of a MUST system is effectively improved while maintaining little influence on the existing Long Term Evolution (LTE) signaling.

The technical solution of the embodiments of the disclosure is implemented as follows.

An embodiment of the disclosure provides an information transmission method. The method includes that:
indication information for a target terminal is acquired; and
the indication information is sent to the target terminal to enable the target terminal to cancel interference based on the indication information during data reception of multi-user superposition.

In the above solution, the indication information may include at least one of the following:

a data transmission mode, a Demodulation Reference Signal (DMRS) port used by an interference terminal, a rank used by an interference signal, precoding information used by the interference signal, Physical Resource Block (PRB) granularity used in MUST, layer quantity of target signal data, and a sequence number of a layer where the interfered target signal data is located.

In the above solution, the indication information may include the following information:
an interference presence Identification (ID); a modulation order of an interference signal; and joint coding domain information of a port, a scrambling ID, and layer quantity.

In the above solution, the port may be a DMRS port used by an interference terminal, the scrambling ID may be a scrambling ID used by an interference signal, and layer quantity may be layer quantity of an interference signal data.

In the above solution, the interference presence ID and the modulation order of the interference signal may be indicated by joint coding.

In the above solution, the interference presence ID, the port, the scrambling ID and layer quantity may be indicated by joint coding.

In the above solution, DMRS port information of the target terminal and DMRS port information of the interference terminal may be jointly indicated by one signaling, or, DMRS port information of the target terminal may be indicated by one signaling, and DMRS port information of the interference terminal may be indicated by one signaling.

In the above solution, layer quantity of the target signal data may be 1, and layer quantity of the interference signal data may be 1.

In the above solution, in a case that DMRS ports of the target terminal and the interference terminal are different, scrambling IDs of the target terminal and the interference terminal may be set to be the same or different.

In the above solution, a set is predefined, and an element of the set may be a Physical Downlink Shared Channel (PDSCH) power parameter. The PDSCH power parameter may be a first type of PDSCH power parameter or a second type of PDSCH power parameter. Downlink Control Information (DCI) may be used to indicate that the first type of PDSCH power parameter or the second type of PDSCH power parameter is selected, and a transmitting power may be determined according to the PDSCH power parameter.

In the above solution, the PDSCH power parameter may indicate a power of a synthesized symbol or a power of a component symbol of the synthesized symbol.

In the above solution, a calculation mode may be indicated by DCI, a PDSCH power parameter may be calculated according to the indicated calculation mode, and a transmitting power may be determined according to the calculated PDSCH power parameter.

A domain may be defined in the DCI and the overhead is 1 bit; when a value is 0, the PDSCH power parameter is obtained by using a first calculation mode; and when the value is 1, the PDSCH power parameter is obtained by using a second calculation mode.

The value of the PDSCH power parameter may be −6 dB, −3 dB, 0 dB, 1 dB, 2 dB, 3 dB.

In the above solution, the calculation mode may include: a first type of calculation mode which refers to obtaining the PDSCH power parameter based on a PDSCH power where a synthesized symbol is located; and a second type of calculation mode which refers to obtaining the PDSCH power parameter based on a power of a component symbol of a synthesized symbol.

In the above solution, the precoding information used by the interference signal may be a Precoding Matrix Indicator (PMI) used by the interference signal, or a storage sequence number of the PMI used by the interference signal; the PMI used by the interference signal may be a non-negative integer; and the storage sequence number of the PMI used by the interference signal may be a non-negative integer.

In the above solution, the indication information may include the storage sequence number of the PMI used by the interference signal.

Correspondingly, the operation of acquiring the indication information for the target terminal may include the operations as follows:
  a PMI used by the target signal, a rank used by the target signal, the PMI used by the interference signal, a rank used by the interference signal, and a first information comparison table used by the interference signal are acquired;
  the first information comparison table is searched for based on the PMI used by the target signal, the rank used by the target signal, the PMI used by the interference signal and the rank used by the interference signal, so as to obtain the storage sequence number of the PMI used by the interference signal.

In the above solution, the data transmission mode may include: a MUST mode and a non-MUST mode.

In the above solution, the data transmission mode may be the MUST mode.

Correspondingly, the PRB granularity used by the MUST may include three types: full bandwidth, predefined subband, and custom PRB granularity.

In the above solution, the method further may include that:
  when the data transmission mode is MUST, it is determined that the DMRS port used by the target terminal is a first port and the DMRS port used by the interference terminal is a second port according to a predetermined criterion, and thus data is sent based on the first port and the second port.

The DMRS port used by the target terminal may be one-to-one mapping with the DMRS port used by the interference terminal.

In the above solution, determining that the DMRS port used by the target terminal is a first port and the DMRS port used by the interference terminal is a second port according to a predetermined criterion may include that:
  when there is one DMRS port used by the target terminal and there is one DMRS port used by the interference terminal,
    it is determined that the DMRS port number used by the target terminal is 7 and the DMRS port number used by the interference terminal is 8 according to a predetermined criterion;
    or, it is determined that the DMRS port number used by the target terminal is 7 and the DMRS port number used by the interference terminal is 9 according to a predetermined criterion;
    or, it is determined that the DMRS port number used by the target terminal is 7 and the DMRS port number used by the interference terminal is 10 according to a predetermined criterion;
    or, it is determined that the DMRS port number used by the target terminal is 8 and the DMRS port number used by the interference terminal is 7 according to a predetermined criterion;
    or, it is determined that the DMRS port number used by the target terminal is 8 and the DMRS port number used by the interference terminal is 9 according to a predetermined criterion;
    or, it is determined that the DMRS port number used by the target terminal is 8 and the DMRS port number used by the interference terminal is 10 according to a predetermined criterion;
  when there are two DMRS ports used by the target terminal and there are two DMRS ports used by the interference terminal,
    it is determined that the sequence numbers of the DMRS ports used by the target terminal are 7 and 8 and the sequence numbers of the DMRS ports used by the interference terminal is 7 and 8 according to a predetermined criterion;
    or, it is determined that the sequence numbers of the DMRS ports used by the target terminal are 7 and 8 and the sequence numbers of the DMRS ports used by the interference terminal are 9 and 10 according to a predetermined criterion;
    or, it is determined that the sequence numbers of the DMRS ports used by the target terminal are 7 and 9 and the sequence numbers of the DMRS ports used by the interference terminal are 8 and 10 according to a predetermined criterion;
    or, it is determined that the sequence numbers of the DMRS ports used by the target terminal are 8 and 10 and the sequence numbers of the DMRS ports used by the interference terminal are 7 and 9 according to a predetermined criterion;
  when there are two DMRS ports used by the target terminal and there is one DMRS port used by the interference terminal,
    it is determined that the sequence numbers of the DMRS ports used by the target terminal are 7 and 8 and the DMRS port number used by the interference terminal is 7 according to a predetermined criterion;
    or, it is determined that the sequence numbers of the DMRS ports used by the target terminal are 7 and 8 and the DMRS port number used by the interference terminal is 8 according to a predetermined criterion;
    or, it is determined that the sequence numbers of the DMRS ports used by the target terminal are 7 and 8 and the DMRS port number used by the interference terminal is 9 according to a predetermined criterion;
    or, it is determined that the sequence numbers of the DMRS ports used by the target terminal are 7 and 8 and the DMRS port number used by the interference terminal is 10 according to a predetermined criterion;
    or, it is determined that the sequence numbers of the DMRS ports used by the target terminal are 7 and 9 and the DMRS port number used by the interference terminal is 8 according to a predetermined criterion;
    or, it is determined that the sequence numbers of the DMRS ports used by the target terminal are 7 and 9 and the DMRS port number used by the interference terminal is 10 according to a predetermined criterion;
    or, it is determined that the sequence numbers of the DMRS ports used by the target terminal are 8 and 10 and the DMRS port number used by the interference terminal is 7 according to a predetermined criterion;

or, it is determined that the sequence numbers of the DMRS ports used by the target terminal are 8 and 10 and the DMRS port number used by the interference terminal is 9 according to a predetermined criterion;

or, it is determined that the sequence numbers of the DMRS ports used by the target terminal are 9 and 10 and the DMRS port number used by the interference terminal is 7 according to a predetermined criterion;

or, it is determined that the sequence numbers of the DMRS ports used by the target terminal are 9 and 10 and the DMRS port number used by the interference terminal is 8 according to a predetermined criterion;

or, it is determined that the sequence numbers of the DMRS ports used by the target terminal are 9 and 10 and the DMRS port number used by the interference terminal is 9 according to a predetermined criterion;

or, it is determined that the sequence numbers of the DMRS ports used by the target terminal are 9 and 10 and the DMRS port number used by the interference terminal is 10 according to a predetermined criterion.

An embodiment of the disclosure also provides an information transmission method. The method includes that:

indication information sent by a base station is received.

interference is cancelled based on the indication information during data reception of multi-user superposition.

In the above solution, a receiving side may obtain a PDSCH power parameter according to DCI, and demodulate received data according to the obtained PDSCH power parameter.

In the above solution, the receiving side may obtain a calculation mode according to DCI to further obtain a PDSCH power parameter according to the calculation mode, and demodulate received data according to the calculated PDSCH power parameter.

In the above solution, the indication information may include a storage sequence number of a PMI used by an interference signal.

Correspondingly, after indication information sent by a base station is received, the method further includes that:

a PMI used by a target signal, a rank used by the target signal and a first information comparison table used by the target signal are acquired; and the first information comparison table is searched for based on a storage sequence number of a PMI used by the interference signal, the PMI used by the target signal and the rank used by the target signal, so as to obtain the PMI used by the interference signal.

In the above solution, the first information comparison table may represent a correspondence between the PMI used by the target signal and the PMI used by the interference signal, the correspondence being determined according to an angle between a codeword indicated by the PMI used by the target signal and a codeword indicated by the PMI used by the interference signal.

In the above solution, the indication information may include a data transmission mode and a DMRS port used by a target terminal, wherein the data transmission mode is a MUST mode.

Correspondingly, after the indication information sent by the base station is received, the method further includes that:

the DMRS port number used by the target terminal is acquired from the indication information, and a sequence number of a DMRS port used by an interference terminal is obtained according to the DMRS port number used by the target terminal.

An embodiment of the disclosure also provides an information transmission device. The device is located on a base station, and includes: an acquisition module and a sending module.

The acquisition module may be configured to acquire indication information for a target terminal.

The sending module may be configured to send the indication information to the target terminal to enable the target terminal to cancel interference based on the indication information during data reception of multi-user superposition.

In the above solution, the indication information includes at least one of the following:

a data transmission mode, a DMRS port used by an interference terminal, a rank used by an interference signal, precoding information used by the interference signal, PRB granularity used in MUST, layer quantity of target signal data, and a sequence number of a layer where the interfered target signal data is located.

In the above solution, the indication information may include the following information:

an interference presence ID; a modulation order of an interference signal; and joint coding domain information of a port, a scrambling ID, and layer quantity.

In the above solution, the port may be a DMRS port used by an interference terminal, the scrambling ID may be a scrambling ID used by an interference signal, and layer quantity may be layer quantity of an interference signal data.

In the above solution, the interference presence ID and the modulation order used by the interference signal may be indicated by joint coding.

In the above solution, the interference presence ID, the port, the scrambling ID and layer quantity may be indicated by joint coding.

In the above solution, layer quantity of the target signal data may be 1, and layer quantity of the interference signal data may be 1.

In the above solution, in a case that DMRS ports of the target terminal and the interference terminal are different, scrambling IDs of the target terminal and the interference terminal may be set to be the same.

In the above solution, the precoding information used by the interference signal may be: a PMI used by the interference signal, or a storage sequence number of the PMI used by the interference signal; the PMI used by the interference signal is a non-negative integer; and the storage sequence number of the PMI used by the interference signal is a non-negative integer.

In the above solution, a set may be predefined, and an element of the set may be a PDSCH power parameter. The PDSCH power parameter may be a first type of PDSCH power parameter or a second type of PDSCH power parameter. DCI may be used to indicate that the first type of PDSCH power parameter or the second type of PDSCH power parameter is selected, and transmitting power is determined according to the PDSCH power parameter.

In the above solution, the first type of PDSCH power parameter may be obtained based on a PDSCH power where a synthesized symbol is located, and the second type of PDSCH power parameter may be obtained based on a power of a component symbol of the synthesized symbol.

In the above solution, a set may be predefined, and an element of the set may be a PDSCH power parameter. A calculation mode is indicated by DCI, a PDSCH power parameter is calculated according to the indicated calculation mode, and a transmitting power is determined according to the calculated PDSCH power parameter.

A domain may be defined in the DCI, the overhead is 1 bit; when the value is 0, the PDSCH power parameter is obtained by using a first calculation mode, and when the value is 1, the PDSCH power parameter is obtained by using a second calculation mode.

In the above solution, the calculation mode may include: a first type of calculation mode which is obtaining the PDSCH power parameter based on a PDSCH power where the synthesized symbol is located; and a second type of calculation modes which is obtaining the PDSCH power parameter based on a power of a component symbol of the synthesized symbol.

In the above solution, the precoding information used by the interference signal may be: a PMI used by the interference signal, or a storage sequence number of the PMI used by the interference signal; the PMI used by the interference signal is a non-negative integer; and the storage sequence number of the PMI used by the interference signal is a non-negative integer.

In the above solution, the indication information may include a storage sequence number of a PMI used by the interference signal.

Correspondingly, the acquisition module may be further configured to:
  acquire a PMI used by the target signal, a rank used by the target signal, the PMI used by the interference signal, a rank used by the interference signal, and a first information comparison table used by the interference signal; and
  search for the first information comparison table based on the PMI used by the target signal, the rank used by the target signal, the PMI used by the interference signal and the rank used by the interference signal, so as to obtain the storage sequence number of the PMI used by the interference signal.

In the above solution, the acquisition module may be further configured to determine, when the data transmission mode is MUST, that the DMRS port used by the target terminal is a first port and the DMRS port used by the interference terminal is a second port according to a predetermined criterion, and thus send data based on the first port and the second port.

The DMRS port used by the target terminal may be one-to-one mapping the DMRS port used by the interference terminal.

In the above solution, the acquisition module may be further configured to:
  when there is one DMRS port used by the target terminal and there is one DMRS port used by the interference terminal,
    determine that the DMRS port number used by the target terminal is 7 and the DMRS port number used by the interference terminal is 8 according to a predetermined criterion;
    or, determine that the DMRS port number used by the target terminal is 7 and the DMRS port number used by the interference terminal is 9 according to a predetermined criterion;
    or, determine that the DMRS port number used by the target terminal is 7 and the DMRS port number used by the interference terminal is 10 according to a predetermined criterion;
    or, determine that the DMRS port number used by the target terminal is 8 and the DMRS port number used by the interference terminal is 7 according to a predetermined criterion;
    or, determine that the DMRS port number used by the target terminal is 8 and the DMRS port number used by the interference terminal is 9 according to a predetermined criterion;
    or, determine that the DMRS port number used by the target terminal is 8 and the DMRS port number used by the interference terminal is 10 according to a predetermined criterion;
  when there are two DMRS ports used by the target terminal and there are two DMRS ports used by the interference terminal,
    determine that the sequence numbers of the DMRS ports used by the target terminal are 7 and 8 and the sequence numbers of the DMRS ports used by the interference terminal is 7 and 8 according to a predetermined criterion;
    or, determine that the sequence numbers of the DMRS ports used by the target terminal are 7 and 8 and the sequence numbers of the DMRS ports used by the interference terminal are 9 and 10 according to a predetermined criterion;
    or, determine that the sequence numbers of the DMRS ports used by the target terminal are 7 and 9 and the sequence numbers of the DMRS ports used by the interference terminal are 8 and 10 according to a predetermined criterion;
    or, determine that the sequence numbers of the DMRS ports used by the target terminal are 8 and 10 and the sequence numbers of the DMRS ports used by the interference terminal are 7 and 9 according to a predetermined criterion;
  when there are two DMRS ports used by the target terminal and there is one DMRS port used by the interference terminal,
    determine that the sequence numbers of the DMRS ports used by the target terminal are 7 and 8 and the DMRS port number used by the interference terminal is 7 according to a predetermined criterion;
    or, determine that the sequence numbers of the DMRS ports used by the target terminal are 7 and 8 and the DMRS port number used by the interference terminal is 8 according to a predetermined criterion;
    or, determine that the sequence numbers of the DMRS ports used by the target terminal are 7 and 8 and the DMRS port number used by the interference terminal is 9 according to a predetermined criterion;
    or, determine that the sequence numbers of the DMRS ports used by the target terminal are 7 and 8 and the DMRS port number used by the interference terminal is 10 according to a predetermined criterion;
    or, determine that the sequence numbers of the DMRS ports used by the target terminal are 7 and 9 and the DMRS port number used by the interference terminal is 8 according to a predetermined criterion;
    or, determine that the sequence numbers of the DMRS ports used by the target terminal are 7 and 9 and the DMRS port number used by the interference terminal is 10 according to a predetermined criterion;
    or, determine that the sequence numbers of the DMRS ports used by the target terminal are 8 and 10 and the DMRS port number used by the interference terminal is 7 according to a predetermined criterion;
    or, determine that the sequence numbers of the DMRS ports used by the target terminal are 8 and 10 and the DMRS port number used by the interference terminal is 9 according to a predetermined criterion;

or, determine that the sequence numbers of the DMRS ports used by the target terminal are 9 and 10 and the DMRS port number used by the interference terminal is 7 according to a predetermined criterion;

or, determine that the sequence numbers of the DMRS ports used by the target terminal are 9 and 10 and the DMRS port number used by the interference terminal is 8 according to a predetermined criterion;

or, determine that the sequence numbers of the DMRS ports used by the target terminal are 9 and 10 and the DMRS port number used by the interference terminal is 9 according to a predetermined criterion;

or, determine that the sequence numbers of the DMRS ports used by the target terminal are 9 and 10 and the DMRS port number used by the interference terminal is 10 according to a predetermined criterion.

An embodiment of the disclosure also provides an information transmission device. The device is located on a target terminal and includes: a receiving module and a processing module.

The receiving module may be configured to receive indication information sent by a base station.

The processing module may be configured to perform interference cancellation based on the indication information during data reception of multi-user superposition.

In the above solution, the indication information may include a storage sequence number of a PMI used by an interference signal.

Correspondingly, the processing module may be further configured to:

acquire a PMI used by a target signal, a rank used by the target signal, a rank used by the target signal, and a first information comparison table used by the target signal; and search for the first information comparison table based on a storage sequence number of a PMI used by the interference signal, the rank used by the target signal, the PMI used by the target signal and the rank used by the target signal, so as to obtain the PMI used by the interference signal.

In the above solution, the indication information may include: a data transmission mode and a DMRS port used by a target terminal, wherein the data transmission mode is a MUST mode.

Correspondingly, the processing module may be further configured to acquire the DMRS port number used by the target terminal from the indication information, and obtain a DMRS port used by an interference terminal according to the DMRS port used by the target terminal.

An embodiment of the disclosure also provides a computer storage medium having a computer program stored therein. The computer program is configured to perform the information transmission method according to the embodiments of the disclosure.

According to the information transmission methods and devices and the storage medium provided in the embodiments of the disclosure, a base station acquires indication information for a target terminal, and sends the indication information to the target terminal to enable the target terminal to cancel interference based on the indication information during data reception of multi-user superposition. Thus, the target terminal is enabled to receive information required for interference cancellation with less overhead. The interference cancellation performance of a MUST system is effectively improved while maintaining little influence on the existing LTE signaling.

BRIEF DESCRIPTION OF DRAWINGS

FIG. 12 is a twelfth schematic flowchart of an information transmission method according to an embodiment of the disclosure.

FIG. 13 is a thirteenth schematic flowchart of an information transmission method according to an embodiment of the disclosure.

FIG. 14 is a fourteenth schematic flowchart of an information transmission method according to an embodiment of the disclosure.

FIG. 16 is a schematic diagram of PRB granularity used by MUST according to an embodiment of the disclosure.

FIG. 17 is a seventeenth schematic flowchart of an information transmission method according to an embodiment of the disclosure.

FIG. 18 is a first composition structure diagram of an information transmission device according to an embodiment of the disclosure.

DETAILED DESCRIPTION

The disclosure will be described in detail below with reference to the drawings in conjunction with the embodiments. It is to be noted that embodiments in the present application and characteristics in the embodiments may be combined under the condition of no conflicts.

Embodiment 1

Figure 1:
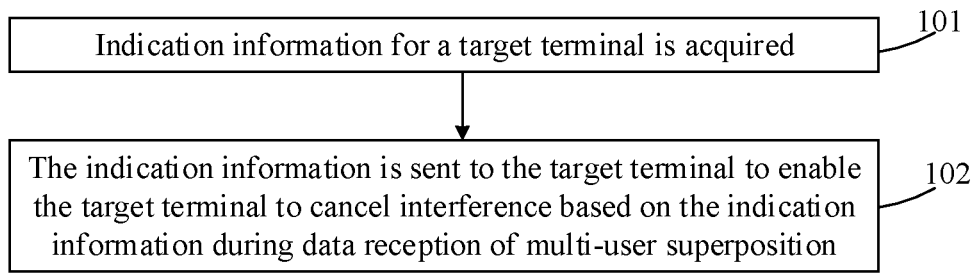
FIG. 1 is a first schematic flowchart of an information transmission method according to an embodiment of the disclosure.

FIG. 1 is a schematic flowchart of an information transmission method according to an embodiment of the disclosure. The method is applied to a base station. As shown in FIG. 1, the information transmission method according to an embodiment of the disclosure includes the operations as follows.

In the operation 101, indication information for a target terminal is acquired.

Here, the indication information is used for the target terminal to perform interference cancellation based on the indication information during data reception of multi-user superposition.

The indication information may separately indicate a certain piece of information by means of independent coding or joint coding, or jointly indicate multiple pieces of information by means of independent coding and joint coding, and the indication information includes at least one of the following:
- a data transmission mode, a DMRS port used by an interference terminal, a rank used by an interference signal, precoding information used by the interference signal, PRB granularity used by MUST, layer quantity of target signal data, and a sequence number of a layer where the interfered target signal data is located.

The precoding information used by the interference signal is: a PMI used by the interference signal, or a storage sequence number of the PMI used by the interference signal; the PMI used by the interference signal is a non-negative integer; and the storage sequence number of the PMI used by the interference signal is a non-negative integer.

In practical applications, layer quantity of the target signal data is less than or equal to k; preferably, k is 2 or 4; for example, k is 2, that is, the number of layers of the target signal data is 2, and correspondingly, the sequence number of a layer where the interfered target signal data is located may be a first layer, a second layer, or the first layer and the second layer.

In practical applications, the indication information may only indicate whether the data transmission mode from the base station to the target terminal is a MUST mode.

The indication information may also indicate layer quantity of the target signal data and the sequence number of the layer where the interfered target signal data is located, that is, the layer quantity of data of a target signal, and which layers of data are interfered by other signals.

The indication information may also indicate that the data transmission mode from the base station to the target terminal is the MUST mode, and indicate layer quantity of the target signal data, and the sequence number of the layer where the interfered target signal data is located.

The indication information may also indicate a (used) DMRS port used by the target terminal, layer quantity of the target signal data, and the sequence number of the layer where the interfered target signal data is located.

The indication information may also indicate only one of the following three types of information: a DMRS port used by an interference terminal, a PMI used by an interference signal, and a storage sequence number of the PMI used by the interference signal.

When the indication information includes a storage sequence number of the PMI used by the interference signal, the operation that the base station acquires a storage sequence number of the PMI used by the interference signal for the target terminal includes the operations as follows:
- a PMI used by a target signal, a rank used by the target signal, a PMI used by an interference signal, a rank used by the interference signal, and a first information comparison table used by the interference signal are acquired;
- the first information comparison table is searched for based on the PMI used by the target signal, the rank used by the target signal, the PMI used by the interference signal and the rank used by the interference signal, so as to obtain a storage sequence number of the PMI used by the interference signal.

Here, the rank used by the interference signal is the same as the rank used by the target signal.

The first information comparison table is a table of comparison between the PMI used by the interference signal and the storage sequence number of the used PMI.

The data transmission mode included in the execution information may be a MUST mode or a non-MUST mode.

When the data transmission mode is a MUST mode, the PRB granularity used by the MUST may be: a Reference Block Group (RBG), or a sub-band, or a PRB Group configured by an RRC of the base station.

The PRB granularity is dynamically indicated by DCI signaling, which may be full bandwidth, or system predetermined sub-band, or custom PRB granularity.

In an embodiment, when the target terminal adopts transmission diversity, the interference terminal also adopts transmission diversity.

In an embodiment, a mapping relationship between precoding used by the target signal and precoding corresponding to the interference signal specifically may be a packet used by a Cell-specific Reference Signals (CRS) transmission mode. A grouping principle is, for example, that the beam angle is less than or equal to X.

In an embodiment, the method further includes that: when the data transmission mode is MUST, it is determined that the DMRS port used by the target terminal is a first port and the DMRS port used by the interference terminal is a second port according to a predetermined criterion, and data is sent based on the first port and the second port, wherein the DMRS port used by the target terminal is one-to-one mapping with the DMRS port used by the interference terminal.

In an embodiment, when there is one target terminal and there is one interference terminal, and when there is one DMRS port used by the target terminal and there is one DMRS port used by the interference terminal, it is determined that the DMRS port number used by the target terminal is 7 and the DMRS port number used by the interference terminal is 8 according to a predetermined criterion;

or, it is determined that the DMRS port number used by the target terminal is 7 and the DMRS port number used by the interference terminal is 9 according to a predetermined criterion;

or, it is determined that the DMRS port number used by the target terminal is 7 and the DMRS port number used by the interference terminal is 10 according to a predetermined criterion;

or, it is determined that the DMRS port number used by the target terminal is 8 and the DMRS port number used by the interference terminal is 7 according to a predetermined criterion;

or, it is determined that the DMRS port number used by the target terminal is 8 and the DMRS port number used by the interference terminal is 9 according to a predetermined criterion;

or, it is determined that the DMRS port number used by the target terminal is 8 and the DMRS port number used by the interference terminal is 10 according to a predetermined criterion.

When there are two DMRS ports used by the target terminal and there are two DMRS ports used by the interference terminal, it is determined that the sequence numbers of the DMRS ports used by the target terminal are 7 and 8 and the sequence numbers of the DMRS ports used by the interference terminal is 7 and 8 according to a predetermined criterion;

or, it is determined that the sequence numbers of the DMRS ports used by the target terminal are 7 and 8 and the sequence numbers of the DMRS ports used by the interference terminal are 9 and 10 according to a predetermined criterion;

or, it is determined that the sequence numbers of the DMRS ports used by the target terminal are 7 and 9 and the sequence numbers of the DMRS ports used by the interference terminal are 8 and 10 according to a predetermined criterion;

or, it is determined that the sequence numbers of the DMRS ports used by the target terminal are 8 and 10 and the sequence numbers of the DMRS ports used by the interference terminal are 7 and 9 according to a predetermined criterion.

Here, it is to be noted that there are two cases in which the target terminal and the interference terminal use two DMRS ports: one is that there is one target terminal and there is one interference terminal, and the target terminal and the interference terminal use two ports respectively; the other case is that there is one target terminal and there are two interference terminals such as a first interference terminal and a second interference terminal. For the case where there are two interference terminals, each interference terminal has one port, and the sequence number of the used DMRS port is one of the sequence numbers of two DMRS ports available for the interference terminal, which are as follows specifically:

according to a predetermined criterion, the sequence numbers of the DMRS ports used by the target terminal are 7 and 8, the DMRS port number used by the first interference terminal is 7, and the DMRS port number used by the second interference terminal is 8;

or, according to a predetermined criterion, the sequence numbers of the DMRS ports used by the target terminal are 7 and 8, the DMRS port number port used by the first interference terminal is 9, and the DMRS port number used by the second interference terminal is 10;

or, according to a predetermined criterion, the sequence numbers of the DMRS ports used by the target terminal are 9 and 10, the DMRS port number used by the first interference terminal is 7, and the DMRS port number used by the second interference terminal is 8;

or, according to a predetermined criterion, the sequence numbers of the DMRS ports used by the target terminal are 7 and 9, the DMRS port number used by the first interference terminal is 8, and the DMRS port number used by the second interference terminal is 10;

or, according to a predetermined criterion, the sequence numbers of the ports used by the target terminal are 8 and 10, the DMRS port number used by the first interference terminal is 7, and the DMRS port number used by the second interference terminal is 9;

When there is one target terminal and there is one interference terminal, and when there are two DMRS ports used by the target terminal and there is one DMRS port used by the interference terminal, it is determined that the sequence numbers of the DMRS ports used by the target terminal are 7 and 8 and the DMRS port number used by the interference terminal is 7 according to a predetermined criterion;

or, it is determined that the sequence numbers of the DMRS ports used by the target terminal are 7 and 8 and the DMRS port number used by the interference terminal is 8 according to a predetermined criterion;

or, it is determined that the sequence numbers of the DMRS ports used by the target terminal are 7 and 8 and the DMRS port number used by the interference terminal is 9 according to a predetermined criterion;

or, it is determined that the sequence numbers of the DMRS ports used by the target terminal are 7 and 8 and the DMRS port number used by the interference terminal is 10 according to a predetermined criterion;

or, it is determined that the sequence numbers of the DMRS ports used by the target terminal are 7 and 9 and the DMRS port number used by the interference terminal is 8 according to a predetermined criterion;

or, it is determined that the sequence numbers of the DMRS ports used by the target terminal are 7 and 9 and the DMRS port number used by the interference terminal is 10 according to a predetermined criterion;

or, it is determined that the sequence numbers of the DMRS ports used by the target terminal are 8 and 10 and the DMRS port number used by the interference terminal is 7 according to a predetermined criterion;

or, it is determined that the sequence numbers of the DMRS ports used by the target terminal are 8 and 10 and the DMRS port number used by the interference terminal is 9 according to a predetermined criterion;

or, it is determined that the sequence numbers of the DMRS ports used by the target terminal are 9 and 10 and the DMRS port number used by the interference terminal is 7 according to a predetermined criterion;

or, it is determined that the sequence numbers of the DMRS ports used by the target terminal are 9 and 10 and the DMRS port number used by the interference terminal is 8 according to a predetermined criterion;

or, it is determined that the sequence numbers of the DMRS ports used by the target terminal are 9 and 10 and the DMRS port number used by the interference terminal is 9 according to a predetermined criterion;

or, it is determined that the sequence numbers of the DMRS ports used by the target terminal are 9 and 10 and the DMRS port number used by the interference terminal is 10 according to a predetermined criterion.

Here, it is to be noted that when the base station determines the DMRS port used by the target terminal and the DMRS port used by the interference terminal, and sends data based on the determined DMRS ports, even if the corresponding indication information does not include the DMRS port used by the interference terminal, the target terminal can also acquire it according to the predetermined criterion and the DMRS port used by itself.

In an embodiment, when the data transmission mode is a non-MUST mode (normal mode), the remaining MUST mode bits are used to indicate which PRBs in the normal mode are of the MUST mode; and the MUST mode is a predefined mode.

When the data transmission mode is the MUST mode, information used by the MUST mode (at least one of an interference layer, precoding, a port, power, modulation, granularity, and a predefined PRB) is an RRC configuration set, which is configured by dynamical selection through DCI signaling. For example, 2 bits are added in all DCIs, 00 means a normal transmission mode, 01 means a first MUST mode, 10 means a second MUST mode, and 11 means a third MUST mode, wherein first, second and third MUST mode configuration parameters are RRC configurations.

In operation 102, the indication information is sent to the target terminal to enable the target terminal to cancel interference based on the indication information during data reception of multi-user superposition.

By applying the above embodiment of the disclosure, a base station sends information required for a target terminal to cancel interference to a target terminal through indication information, so that the target terminal cancels interference information based on the indication information during data reception of multi-user superposition. Based on actual characteristics of a MUST technology, the redundant information is removed as much as possible to reduce the transmission information overhead. The interference cancellation performance of a MUST system is improved by transmitting downlink MUST parameter information while maintaining little influence on the existing LTE signaling.

Embodiment 2

Figure 2:
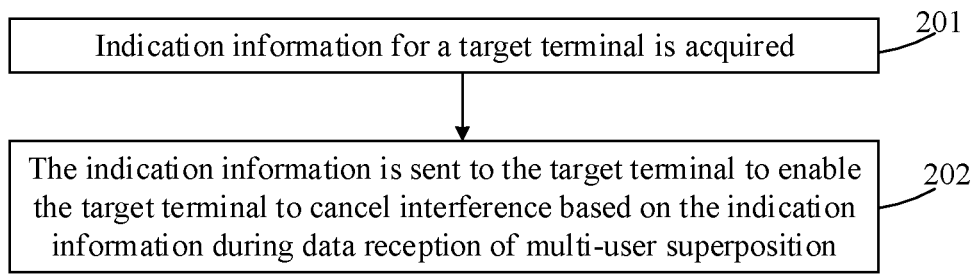
FIG. 2 is a second schematic flowchart of an information transmission method according to an embodiment of the disclosure.

FIG. 2 is a schematic flowchart of an information transmission method according to an embodiment of the disclosure. The method is applied to a base station. As shown in FIG. 2, the information transmission method according to an embodiment of the disclosure includes the operations as follows.

At operation 201, indication information for a target terminal is acquired.

Here, the indication information is used for the target terminal to perform interference cancellation based on the indication information during data reception of multi-user superposition.

The indication information is: an interference presence ID, a modulation order used by an interference signal, a DMRS port used by an interference terminal, a scrambling ID used by the interference signal, and layer quantity of interference signal data.

Layer quantity of target signal data is 1. Layer quantity of interference signal data is 1.

The overhead of the indication information is 3 bits in total, wherein the overhead of joint coding of the interference presence ID and a modulation mode is 2 bit, as shown in Table 2.1. The overhead of joint coding of layer quantity of the interference signal data, the scrambling ID used by the interference signal and the DMRS port used by the interference terminal is 1 bit.

TABLE 2.1

Joint coding of interference presence ID and modulation order (overhead is 2 bit)
Modulation order used by interference signal

| Value | Message |
|---|---|
| 0 | Interference absence |
| 1 | QPSK |
| 2 | 16QAM |
| 3 | 64QAM |

TABLE 2.2

Joint coding of the sequence number of DMRS port of interference terminal, the scrambling ID and the number of layers (overhead is 1 bit)

| Target terminal | | Interference terminal | |
|---|---|---|---|
| Value | Message | Value | Message |
| 0 | 1 layer, port 7, nSCID = 0 (OCC = 2 or OCC = 4) | 0 | 1 layer, port 7, nSCID = 1 |
| | | 1 | 1 layer, port 8, nSCID = 0 |
| 1 | 1 layer, port 7, nSCID = 1 (OCC = 2 or OCC = 4) | 0 | 1 layer, port 7, nSCID = 0 |
| | | 1 | 1 layer, port 8, nSCID = 1 |
| 2 | 1 layer, port 8, nSCID = 0 (OCC = 2 or OCC = 4) | 0 | 1 layer, port 7, nSCID = 0 |
| | | 1 | 1 layer, port 8, nSCID = 1 |
| 3 | 1 layer, port 8, nSCID = 1 (OCC = 2 or OCC = 4) | 0 | 1 layer, port 7, nSCID = 1 |
| | | 1 | 1 layer, port 8, nSCID = 0 |
| 4 | 1 layer, port 11, nSCID = 0 (OCC = 4) | 0 | 1 layer, port 11, nSCID = 1 |
| | | 1 | 1 layer, port 13, nSCID = 0 |
| 5 | 1 layer, port 11, nSCID = 1 (OCC = 4) | 0 | 1 layer, port 11, nSCID = 0 |
| | | 1 | 1 layer, port 13, nSCID = 1 |
| 6 | 1 layer, port 13, nSCID = 0 (OCC = 4) | 0 | 1 layer, port 11, nSCID = 0 |
| | | 1 | 1 layer, port 13, nSCID = 1 |
| 7 | 1 layer, port 13, nSCID = 1 (OCC = 4) | 0 | 1 layer, port 11, nSCID = 1 |
| | | 1 | 1 layer, port 13, nSCID = 0 |

In Table 2.2, if the DMRS ports of the target terminal and the interference terminal are the same, the SCIDs thereof are different. If the DMRS ports of the target terminal and the interference terminal are different, the SCIDs thereof are the same.

At operation 202, the indication information is sent to the target terminal to enable the target terminal to cancel interference based on the indication information during data reception of multi-user superposition.

Embodiment 3

Figure 3:
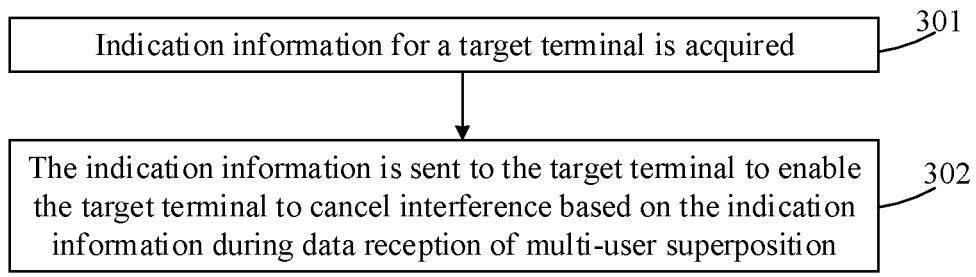
FIG. 3 is a third schematic flowchart of an information transmission method according to an embodiment of the disclosure.

FIG. 3 is a schematic flowchart of an information transmission method according to an embodiment of the disclosure. The method is applied to a base station. As shown in FIG. 3, the information transmission method according to an embodiment of the disclosure includes the operations as follows.

At operation 301, indication information for a target terminal is acquired.

Here, the indication information is used for the target terminal to perform interference cancellation based on the indication information during data reception of multi-user superposition.

The indication information is: an interference presence ID, a DMRS port used by an interference terminal, and a modulation order used by an interference signal.

The layer quantity of data of a target signal is 1. The layer quantity of data of an interference signal is 1.

The overhead of the indication information is 4 bit in total, wherein the overhead of the interference presence ID is 1 bit, the overhead of the modulation mode is 2 bit, and the overhead of the DMRS port number is 1 bit, as shown in Tables 3.1 to 3.3.

TABLE 3.1

Interference presence of interference terminal
(overhead is 1 bit)
Interference presence ID of interference terminal

| Value | Message |
|---|---|
| 0 | Interference absence |
| 1 | Interference presence |

TABLE 3.2

Modulation mode of interference terminal
(overhead is 2 bit)
Modulation mode of interference signal

| Value | Message |
|---|---|
| 0 | QPSK |
| 1 | 16QAM |
| 2 | 64QAM |
| 3 | Reserved |

TABLE 3.3

Joint coding of layer quantity, Scrambling ID (SCID) and sequence number of DMRS port of interference terminal (overhead is 1 bit)

| Target terminal | | Interference terminal | |
|---|---|---|---|
| Value | Message | Value | Message |
| 0 | 1 layer, port 7, $n_{SCID} = 0$ (OCC = 2 or OCC = 4) | 0 | 1 layer, port 7, $n_{SCID} = 1$ |
|  |  | 1 | 1 layer, port 8, $n_{SCID} = 0$ |
| 1 | 1 layer, port 7, $n_{SCID} = 1$ (OCC = 2 or OCC = 4) | 0 | 1 layer, port 7, $n_{SCID} = 0$ |
|  |  | 1 | 1 layer, port 8, $n_{SCID} = 1$ |
| 2 | 1 layer, port 8, $n_{SCID} = 0$ (OCC = 2 or OCC = 4) | 0 | 1 layer, port 7, $n_{SCID} = 0$ |
|  |  | 1 | 1 layer, port 8, $n_{SCID} = 1$ |
| 3 | 1 layer, port 8, $n_{SCID} = 1$ (OCC = 2 or OCC = 4) | 0 | 1 layer, port 7, $n_{SCID} = 1$ |
|  |  | 1 | 1 layer, port 8, $n_{SCID} = 0$ |
| 4 | 1 layer, port 11, $n_{SCID} = 0$ (OCC = 4) | 0 | 1 layer, port 11, $n_{SCID} = 1$ |
|  |  | 1 | 1 layer, port 13, $n_{SCID} = 0$ |
| 5 | 1 layer, port 11, $n_{SCID} = 1$ (OCC = 4) | 0 | 1 layer, port 11, $n_{SCID} = 0$ |
|  |  | 1 | 1 layer, port 13, $n_{SCID} = 1$ |
| 6 | 1 layer, port 13, $n_{SCID} = 0$ (OCC = 4) | 0 | 1 layer, port 11, $n_{SCID} = 0$ |
|  |  | 1 | 1 layer, port 13, $n_{SCID} = 1$ |
| 7 | 1 layer, port 13, $n_{SCID} = 1$ (OCC = 4) | 0 | 1 layer, port 11, $n_{SCID} = 1$ |
|  |  | 1 | 1 layer, port 13, $n_{SCID} = 0$ |

In Table 3.2, in a case that the sequence numbers of the DMRS ports of the target terminal and the interference terminal are the same, the SCIDs thereof are different. In a case that the sequence numbers of the DMRS ports of the target terminal and the interference terminal are different, the SCIDs thereof are the same.

At operation 302, the indication information is sent to the target terminal to enable the target terminal to cancel interference based on the indication information during data reception of multi-user superposition.

Embodiment 4

Figure 4:
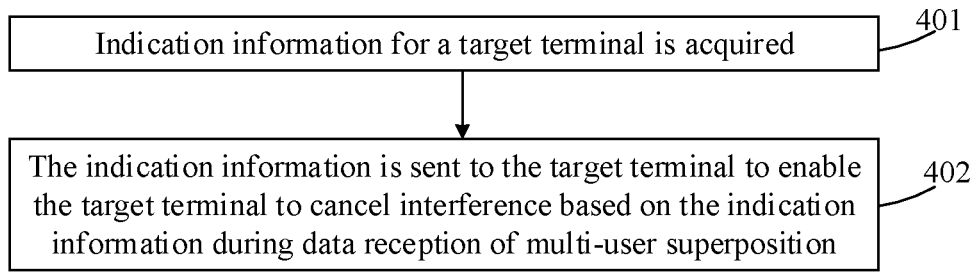
FIG. 4 is a fourth schematic flowchart of an information transmission method according to an embodiment of the disclosure.

FIG. 4 is a schematic flowchart of an information transmission method according to an embodiment of the disclosure. The method is applied to a base station. As shown in FIG. 4, the information transmission method according to an embodiment of the disclosure includes the operations as follows.

At the operation 401, indication information for a target terminal is acquired.

Here, the indication information is used for the target terminal to perform interference cancellation based on the indication information during data reception of multi-user superposition.

The indication information is: an interference presence ID, a DMRS port used by an interference terminal, and a modulation order used by an interference signal.

The layer quantity of data of a target signal is 1. The layer quantity of data of an interference signal is 1.

The overhead of the indication information is 4 bit in total, wherein the overhead of the modulation mode is 2 bit, the overhead of joint coding of the interference presence ID and the DMRS port number of the interference terminal is 2 bit. Mobile Origination Call (MO) of interference terminal is taken as an example, as shown in Tables 4.1 to 4.2 below.

TABLE 4.1

Modulation mode of interference terminal (overhead is 2 bit)
MO of interference terminal

| Value | Message |
|---|---|
| 0 | QPSK |
| 1 | 16QAM |
| 2 | 64QAM |
| 3 | Reserved |

TABLE 4.2

Joint coding of interference presence ID, sequence number
of DMRS port of interference terminal, scrambling ID and
layer quantity (overhead is 2 bit)

| Target terminal | | Interference terminal | |
|---|---|---|---|
| Value | Message | Value | Message |
| 0 | 1 layer, port 7, $n_{SCID} = 0$ (OCC = 2 or OCC = 4) | 0 | Interference absence |
|  |  | 1 | 1 layer, port 7, $n_{SCID} = 1$ |
|  |  | 2 | 1 layer, port 8, $n_{SCID} = 0$ |
|  |  | 3 | 1 layer, port 8, $n_{SCID} = 1$ |
| 1 | 1 layer, port 7, $n_{SCID} = 1$ (OCC = 2 or OCC = 4) | 0 | Interference absence |
|  |  | 1 | 1 layer, port 7, $n_{SCID} = 0$ |
|  |  | 2 | 1 layer, port 8, $n_{SCID} = 0$ |
|  |  | 3 | 1 layer, port 8, $n_{SCID} = 1$ |
| 2 | 1 layer, port 8, $n_{SCID} = 0$ (OCC = 2 or OCC = 4) | 0 | Interference absence |
|  |  | 1 | 1 layer, port 7, $n_{SCID} = 0$ |
|  |  | 2 | 1 layer, port 7, $n_{SCID} = 1$ |
|  |  | 3 | 1 layer, port 8, $n_{SCID} = 1$ |
| 3 | 1 layer, port 8, $n_{SCID} = 1$ (OCC = 2 or OCC = 4) | 0 | Interference absence |
|  |  | 1 | 1 layer, port 7, $n_{SCID} = 0$ |
|  |  | 2 | 1 layer, port 7, $n_{SCID} = 1$ |
|  |  | 3 | 1 layer, port 8, $n_{SCID} = 0$ |
| 4 | 1 layer, port 11, $n_{SCID} = 0$ (OCC = 4) | 0 | Interference absence |
|  |  | 1 | 1 layer, port 11, $n_{SCID} = 1$ |
|  |  | 2 | 1 layer, port 13, $n_{SCID} = 0$ |
|  |  | 3 | 1 layer, port 13, $n_{SCID} = 1$ |
| 5 | 1 layer, port 11, $n_{SCID} = 1$ (OCC = 4) | 0 | Interference absence |
|  |  | 1 | 1 layer, port 11, $n_{SCID} = 0$ |
|  |  | 2 | 1 layer, port 13, $n_{SCID} = 0$ |
|  |  | 3 | 1 layer, port 13, $n_{SCID} = 1$ |
| 6 | 1 layer, port 13, $n_{SCID} = 0$ (OCC = 4) | 0 | Interference absence |
|  |  | 1 | 1 layer, port 11, $n_{SCID} = 0$ |
|  |  | 2 | 1 layer, port 11, $n_{SCID} = 1$ |
|  |  | 3 | 1 layer, port 13, $n_{SCID} = 1$ |
| 7 | 1 layer, port 13, $n_{SCID} = 1$ (OCC = 4) | 0 | Interference absence |
|  |  | 1 | 1 layer, port 11, $n_{SCID} = 0$ |
|  |  | 2 | 1 layer, port 11, $n_{SCID} = 1$ |
|  |  | 3 | 1 layer, port 13, $n_{SCID} = 0$ |

In Table 4.2, in a case that the sequence numbers of the DMRS ports of the target terminal and the interference terminal are the same, the SCIDs thereof are different.

At operation 402, the indication information is sent to the target terminal to enable the target terminal to cancel interference based on the indication information during data reception of multi-user superposition.

Embodiment 5

Figure 5:
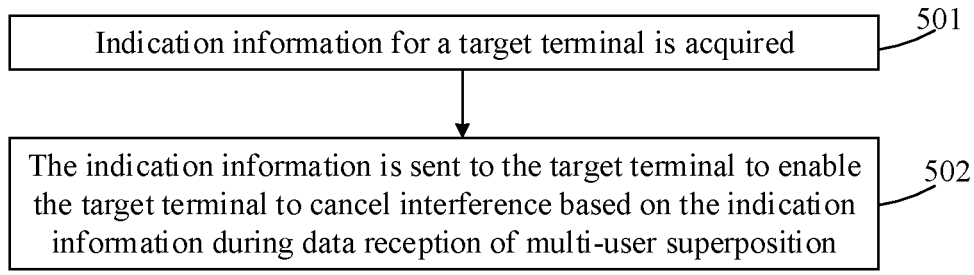
FIG. 5 is a fifth schematic flowchart of an information transmission method according to an embodiment of the disclosure.

FIG. 5 is a schematic flowchart of an information transmission method according to an embodiment of the disclosure. The method is applied to a base station.

As shown in FIG. 5, the information transmission method according to an embodiment of the disclosure includes the operations as follows.

At operation 501, indication information for a target terminal is acquired.

Here, the indication information is used for the target terminal to perform interference cancellation based on the indication information during data reception of multi-user superposition.

The indication information is: an interference presence ID, a DMRS port used by an interference terminal, and a modulation order used by an interference signal.

The layer quantity of data of a target signal is 1 or 2. The layer quantity of data of an interference signal is 1 or 2.

The overhead of the indication information is 4 bit in total, wherein the overhead of joint coding of the interference presence ID and the modulation order is 2 bit, and the overhead of the DMRS port number is 2 bit, as shown in Tables 5.1 to 5.3.

TABLE 5.1

Joint coding of modulation order and interference presence of interference terminal (overhead is 2 bit)
MO of interference terminal

| Value | Message |
|---|---|
| 0 | Interference absence |
| 1 | QPSK |
| 2 | 16QAM |
| 3 | 64QAM |

TABLE 5.2

Joint coding of sequence number of DMRS port of interference terminal, scrambling ID and layer quantity (rank of target terminal is 1) (overhead is 2 bit)

| Target terminal | | Interference terminal | |
|---|---|---|---|
| Value | Message | Value | Message |
| 0 | 1 layer, port 7, $n_{SCID}$ = 0 (OCC = 2 or OCC = 4) | 0 | 1 layer, port 7, $n_{SCID}$ = 1 |
| | | 1 | 1 layer, port 8, $n_{SCID}$ = 0 |
| | | 2 | 1 layer, port 8, $n_{SCID}$ = 1 |
| | | 3 | 2 layer, port 7&8, $n_{SCID}$ = 1 |
| 1 | 1 layer, port 7, $n_{SCID}$ = 1 (OCC = 2 or OCC = 4) | 0 | 1 layer, port 7, $n_{SCID}$ = 0 |
| | | 1 | 1 layer, port 8, $n_{SCID}$ = 0 |
| | | 2 | 1 layer, port 8, $n_{SCID}$ = 1 |
| | | 3 | 2 layer, port 7&8, $n_{SCID}$ = 0 |
| 2 | 1 layer, port 8, $n_{SCID}$ = 0 (OCC = 2 or OCC = 4) | 0 | 1 layer, port 7, $n_{SCID}$ = 0 |
| | | 1 | 1 layer, port 7, $n_{SCID}$ = 1 |
| | | 2 | 1 layer, port 8, $n_{SCID}$ = 1 |
| | | 3 | 2 layer, port 7&8, $n_{SCID}$ = 1 |
| 3 | 1 layer, port 8, $n_{SCID}$ = 1 (OCC = 2 or OCC = 4) | 0 | 1 layer, port 7, $n_{SCID}$ = 0 |
| | | 1 | 1 layer, port 7, $n_{SCID}$ = 1 |
| | | 2 | 1 layer, port 8, $n_{SCID}$ = 0 |
| | | 3 | 2 layer, port 7&8, $n_{SCID}$ = 0 |
| 4 | 1 layer, port 11, $n_{SCID}$ = 0 (OCC = 4) | 1 | 1 layer, port 11, $n_{SCID}$ = 1 |
| | | 2 | 1 layer, port 13, $n_{SCID}$ = 0 |
| | | 3 | 1 layer, port 13, $n_{SCID}$ = 1 |

TABLE 5.2-continued

Joint coding of sequence number of DMRS port of interference terminal, scrambling ID and layer quantity (rank of target terminal is 1) (overhead is 2 bit)

| Target terminal | | Interference terminal | |
|---|---|---|---|
| Value | Message | Value | Message |
| | | 4 | 2 layer, port 11&13, $n_{SCID}$ = 1 |
| 5 | 1 layer, port 11, $n_{SCID}$ = 1 (OCC = 4) | 1 | 1 layer, port 11, $n_{SCID}$ = 0 |
| | | 2 | 1 layer, port 13, $n_{SCID}$ = 0 |
| | | 3 | 1 layer, port 13, $n_{SCID}$ = 1 |
| | | 4 | 2 layer, port 11&13, $n_{SCID}$ = 0 |
| 6 | 1 layer, port 13, $n_{SCID}$ = 0 (OCC = 4) | 1 | 1 layer, port 11, $n_{SCID}$ = 0 |
| | | 2 | 1 layer, port 11, $n_{SCID}$ = 1 |
| | | 3 | 1 layer, port 13, $n_{SCID}$ = 1 |
| | | 4 | 2 layer, port 11&13, $n_{SCID}$ = 1 |
| 7 | 1 layer, port 13, $n_{SCID}$ = 1 (OCC = 4) | 1 | 1 layer, port 11, $n_{SCID}$ = 0 |
| | | 2 | 1 layer, port 11, $n_{SCID}$ = 1 |
| | | 3 | 1 layer, port 13, $n_{SCID}$ = 0 |
| | | 4 | 2 layer, port 11&13, $n_{SCID}$ = 0 |

In Table 5.2, in a case that the sequence numbers of the DMRS ports of the target terminal and the interference terminal are the same, the SCIDs thereof are different.

TABLE 5.3

Sequence number of DMRS port of interference terminal (rank of target terminal is 2) (overhead is 2 bit)

| Target terminal | | Interference terminal | |
|---|---|---|---|
| Value | Message | Value | Message |
| 0 | 2 layer, port 7&8, $n_{SCID}$ = 0 (OCC = 2) | 0 | 1 layer, port 7, $n_{SCID}$ = 1 |
| | | 1 | 1 layer, port 8, $n_{SCID}$ = 1 |
| | | 2 | 2 layer, port 7&8, $n_{SCID}$ = 1 |
| | | 3 | Reserved |
| 1 | 2 layer, port 7&8, $n_{SCID}$ = 1 (OCC = 2) | 0 | 1 layer, port 7, $n_{SCID}$ = 0 |
| | | 1 | 1 layer, port 8, $n_{SCID}$ = 0 |
| 2 | | 2 | 2 layer, port 7&8, $n_{SCID}$ = 0 |
| | | 3 | Reserved |
| | 2 layer, port 11&13, $n_{SCID}$ = 0 (OCC = 4) | 0 | 1 layer, port 11, $n_{SCID}$ = 1 |
| | | 1 | 1 layer, port 13, $n_{SCID}$ = 1 |
| | | 2 | 2 layer, port 11&13, $n_{SCID}$ = 1 |
| | | 3 | Reserved |
| 3 | 2 layer, port 11&13, $n_{SCID}$ = 1 (OCC = 4) | 0 | 1 layer, port 11, $n_{SCID}$ = 0 |
| | | 1 | 1 layer, port 13, $n_{SCID}$ = 0 |
| | | 2 | 2 layer, port 11&13, $n_{SCID}$ = 0 |
| | | 3 | Reserved |

In Table 5.3, in a case that the sequence numbers of the DMRS ports of the target terminal and the interference terminal are the same, the SCIDs thereof are different.

At operation 502, the indication information is sent to the target terminal to enable the target terminal to cancel interference based on the indication information during data reception of multi-user superposition.

Embodiment 6

Figure 6:
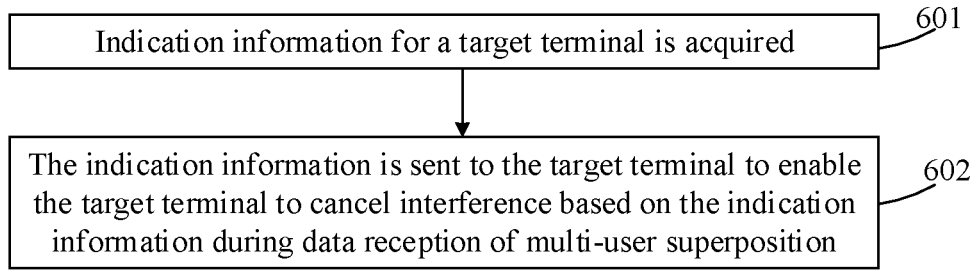
FIG. 6 is a sixth schematic flowchart of an information transmission method according to an embodiment of the disclosure.

FIG. 6 is a schematic flowchart of an information transmission method according to an embodiment of the disclosure. The method is applied to a base station. As shown in FIG. 6, the information transmission method according to an embodiment of the disclosure includes the operations as follows.

At operation 601, indication information for a target terminal is acquired.

Here, the indication information is used for the target terminal to perform interference cancellation based on the indication information during data reception of multi-user superposition.

The indication information is: an interference presence ID, a sequence number of a DMRS port used by an interference terminal, and a modulation order used by an interference signal.

The layer quantity of data of a target signal is 1 or 2. The layer quantity of data of an interference signal is 1 or 2.

The overhead of the indication information is 4 bit in total, wherein the overhead of a modulation order is 2 bit, and the overhead of joint coding of the interference presence ID and the DMRS port number is 2 bit, as shown in Tables 6.1 to 6.3.

TABLE 6.1

Modulation mode of interference terminal
(overhead is 2 bit)
MO of interference terminal

| Value | Message |
|---|---|
| 0 | QPSK |
| 1 | 16QAM |
| 2 | 64QAM |
| 3 | Reserved |

TABLE 6.2

Joint coding of interference presence ID and sequence
number of DMRS port of interference terminal, layer quantity
of data and SCID (rank of target terminal is 1) (overhead is 2 bit)

| Target terminal | | Interference terminal | |
|---|---|---|---|
| Value | Message | Value | Message |
| 0 | 1 layer, port 7, $n_{SCID} = 0$ (OCC = 2 or OCC = 4) | 0 | Interference absence |
| | | 1 | 1 layer, port 7, $n_{SCID} = 1$ |
| | | 2 | 1 layer, port 8, $n_{SCID} = 0$ |
| | | 3 | 2 layer, port 7&8, $n_{SCID} = 1$ |
| 1 | 1 layer, port 7, $n_{SCID} = 1$ (OCC = 2 or OCC = 4) | 0 | Interference absence |
| | | 1 | 1 layer, port 7, $n_{SCID} = 0$ |
| | | 2 | 1 layer, port 8, $n_{SCID} = 1$ |
| | | 3 | 2 layer, port 7&8, $n_{SCID} = 0$ |
| 2 | 1 layer, port 8, $n_{SCID} = 0$ (OCC = 2 or OCC = 4) | 0 | Interference absence |
| | | 1 | 1 layer, port 7, $n_{SCID} = 0$ |
| | | 2 | 1 layer, port 8, $n_{SCID} = 1$ |
| | | 3 | 2 layer, port 7&8, $n_{SCID} = 1$ |
| 3 | 1 layer, port 8, nSCID = 1 (OCC = 2 or OCC = 4) | 0 | Interference absence |
| | | 1 | 1 layer, port 7, $n_{SCID} = 1$ |
| | | 2 | 1 layer, port 8, $n_{SCID} = 0$ |
| | | 3 | 2 layer, port 7&8, $n_{SCID} = 0$ |
| 4 | 1 layer, port 11, $n_{SCID} = 0$ (OCC = 4) | 0 | Interference absence |
| | | 1 | 1 layer, port 11, $n_{SCID} = 1$ |
| | | 2 | 1 layer, port 13, $n_{SCID} = 0$ |
| | | 3 | 2 layer, port 11&13, $n_{SCID} = 1$ |
| 5 | 1 layer, port 11, $n_{SCID} = 1$ (OCC = 4) | 0 | Interference absence |
| | | 1 | 1 layer, port 11, $n_{SCID} = 0$ |
| | | 2 | 1 layer, port 13, $n_{SCID} = 1$ |
| | | 3 | 2 layer, port 11&13, $n_{SCID} = 0$ |
| 6 | 1 layer, port 13, $n_{SCID} = 0$ (OCC = 4) | 0 | Interference absence |
| | | 1 | 1 layer, port 11, $n_{SCID} = 0$ |
| | | 2 | 1 layer, port 13, $n_{SCID} = 1$ |
| | | 3 | 2 layer, port 11&13, $n_{SCID} = 1$ |
| 7 | 1 layer, port 13, $n_{SCID} = 1$ (OCC = 4) | 0 | Interference absence |
| | | 1 | 1 layer, port 11, $n_{SCID} = 1$ |
| | | 2 | 1 layer, port 13, $n_{SCID} = 0$ |
| | | 3 | 2 layer, port 11&13, $n_{SCID} = 0$ |

In Table 6.2, in a case that the sequence numbers of the DMRS ports of the target terminal and the interference terminal are the same, the SCIDs thereof are different. In a case that the sequence numbers of the DMRS ports of the target terminal and the interference terminal are different, the SCIDs thereof are the same.

TABLE 6.3

Joint coding of sequence number of DMRS
port of interference terminal, scrambling ID and layer
quantity (rank of target terminal is 2) (overhead is 2 bit)

| Target terminal | | Interference terminal | |
|---|---|---|---|
| Value | Message | Value | Message |
| 0 | 2 layer, port 7&8, $n_{SCID} = 0$ (OCC = 2) | 0 | Interference absence |
| | | 1 | 1 layer, port 7, $n_{SCID} = 1$ |
| | | 2 | 1 layer, port 8, $n_{SCID} = 1$ |
| | | 3 | 2 layer, port 7&8, $n_{SCID} = 1$ |
| 1 | 2 layer, port 7&8, $n_{SCID} = 1$ (OCC = 2) | 0 | Interference absence |
| | | 1 | 1 layer, port 7, $n_{SCID} = 0$ |
| | | 2 | 1 layer, port 8, $n_{SCID} = 0$ |
| | | 3 | 2 layer, port 7&8, $n_{SCID} = 0$ |
| 2 | 2 layer, port 11&13, $n_{SCID} = 0$ (OCC = 4) | 0 | Interference absence |
| | | 1 | 1 layer, port 11, $n_{SCID} = 1$ |
| | | 2 | 1 layer, port 13, $n_{SCID} = 1$ |
| | | 3 | 2 layer, port 11&13, $n_{SCID} = 1$ |
| 3 | 2 layer, port 11&13, $n_{SCID} = 1$ (OCC = 4) | 0 | Interference absence |
| | | 1 | 1 layer, port 11, $n_{SCID} = 0$ |
| | | 2 | 1 layer, port 13, $n_{SCID} = 0$ |
| | | 3 | 2 layer, port 11&13, $n_{SCID} = 0$ |

In Table 6.3, in a case that the sequence numbers of the DMRS ports of the target terminal and the interference terminal are the same, the SCIDs thereof are different.

At operation 602, the indication information is sent to the target terminal to enable the target terminal to cancel interference based on the indication information during data reception of multi-user superposition.

Embodiment 7

When one codeword stream is enabled and layer quantity of a target terminal is 1, a port used by the target terminal is port 7 or port 8.

Embodiment 8

Figure 7:
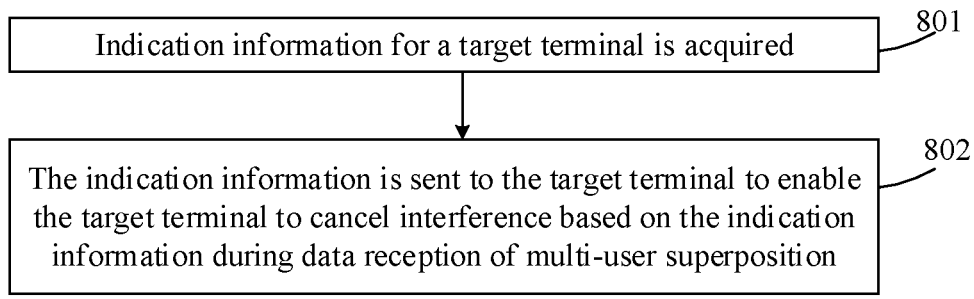
FIG. 7 is a seventh schematic flowchart of an information transmission method according to an embodiment of the disclosure.

FIG. 7 is a schematic flowchart of an information transmission method according to an embodiment of the disclosure. The method is applied to a base station. As shown in FIG. 7, the information transmission method according to an embodiment of the disclosure includes the operations as follows.

At operation 801, indication information for a target terminal is acquired.

Here, the indication information is used for the target terminal to perform interference cancellation based on the indication information during data reception of multi-user superposition.

The indication information is: an interference presence ID, a DMRS port used by an interference terminal, and a modulation order used by an interference signal.

The layer quantity of data of a target signal is 1 or 2. The layer quantity of data of an interference signal is 1 or 2.

The indication information further includes: a DMRS port used by a target terminal.

The indication of the interference presence ID and the modulation order information used by the interference signal refers to the related description of the foregoing embodiments, and details are not described herein again.

The joint coding indicating DMRS information of the interference terminal and DMRS information of the target terminal is as shown in Tables 8.1 to 8.2.

TABLE 8.1

Joint coding of DMRS information of Interference terminal and DMRS information of Target terminal (single codeword stream is enabled) (overhead is 3 bit)

| Value | Message |
|---|---|
| 0 | Target signal is 1 layer, port 7, $n_{SCID} = 0$; Interfernece signal is 1 layer, port 8 $n_{SCID} = 0$; |
| 1 | Target signal is 1 layer, port 7, $n_{SCID} = 1$; Interfernece signal is 1 layer, port 8, $n_{SCID} = 1$; |
| 2 | Target signal is 1 layer, port 8, $n_{SCID} = 0$; Interfernece signal is 1 layer, port 7 $n_{SCID} = 0$; |
| 3 | Target signal is 1 layer, port 8, $n_{SCID} = 1$; Interfernece signal is 1 layer, port 7, $n_{SCID} = 1$; |
| 4 | Target signal is 2 layer, port 7&8, $n_{SCID} = 0$; Interfernece signal is 2 layer, port 11&13, $n_{SCID} = 0$; |
| 5 | Target signal is 2 layer, port 7&8, $n_{SCID} = 1$; Interfernece signal is 2 layer, port 11&13, $n_{SCID} = 1$; |
| 6 | Target signal is 2 layer, port 11&13, $n_{SCID} = 0$; Interfernece signal is 2 layer, port 7&8, $n_{SCID} = 0$; |
| 7 | Target signal is 2 layer, port 11&13, $n_{SCID} = 1$; Interfernece signal is 2 layer, port 7&8, $n_{SCID} = 1$; |

In Table 8.1, in a case that the sequence numbers of the DMRS ports of the target terminal and the interference terminal are the same, the SCIDs thereof are different. In a case that the sequence numbers of the DMRS ports of the target terminal and the interference terminal are different, the SCIDs thereof are the same. The port in Table 8.1 refers to a DMRS port.

TABLE 8.2

Joint coding of DMRS information of Interference terminal and DMRS information of Target terminal (double codeword stream is enabled) (overhead is 3 bit)

| Value | Message |
|---|---|
| 0 | Target signal is 2 layer, port 7&8, $n_{SCID} = 0$; Interfernece signal is 2 layer, port 11&13, $n_{SCID} = 0$; |
| 1 | Target signal is 2 layer, port 7&8, $n_{SCID} = 0$; Interfernece signal is 2 layer, port 11&13, $n_{SCID} = 1$; |
| 2 | Target signal is 2 layer, port 7&8, $n_{SCID} = 1$; Interfernece signal is 2 layer, port 11&13, $n_{SCID} = 0$; |
| 3 | Target signal is 2 layer, port 7&8, $n_{SCID} = 1$; Interfernece signal is 2 layer, port 11&13, $n_{SCID} = 1$; |
| 4 | Target signal is 2 layer, port 11&13, $n_{SCID} = 0$; Interfernece signal is 2 layer, port 7&8, $n_{SCID} = 0$; |
| 5 | Target signal is 2 layer, port 11&13, $n_{SCID} = 0$; Interfernece signal is 2 layer, port 7&8, $n_{SCID} = 1$; |
| 6 | Target signal is 2 layer, port 11&13, $n_{SCID} = 1$; Interfernece signal is 2 layer, port 7&8, $n_{SCID} = 0$; |
| 7 | Target signal is 2 layer, port 11&13, $n_{SCID} = 1$; Interfernece signal is 2 layer, port 7&8, $n_{SCID} = 1$; |

The port in Table 8.2 refers to a DMRS port.

At operation 802, the indication information is sent to the target terminal to enable the target terminal to cancel interference based on the indication information during data reception of multi-user superposition.

Embodiment 9

Figure 8:
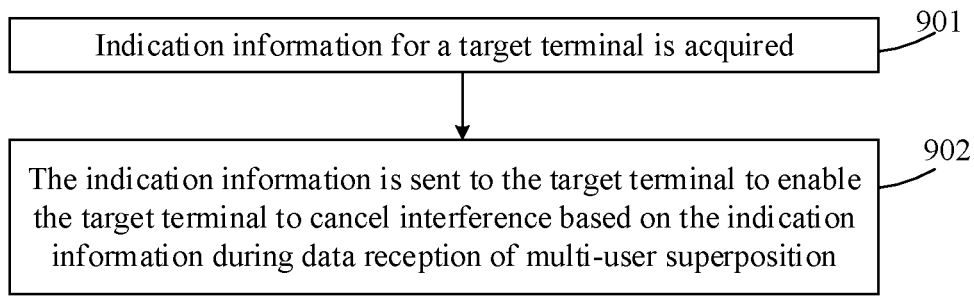
FIG. 8 is an eighth schematic flowchart of an information transmission method according to an embodiment of the disclosure.

FIG. 8 is a schematic flowchart of an information transmission method according to an embodiment of the disclosure. The method is applied to a base station. As shown in FIG. 8, the information transmission method according to an embodiment of the disclosure includes the operations as follows.

At operation 901, indication information for a target terminal is acquired.

Here, the indication information is used for the target terminal to perform interference cancellation based on the indication information during data reception of multi-user superposition.

The indication information is: an interference presence ID, a DMRS port used by an interference terminal, and a modulation order used by an interference signal.

The layer quantity of data of a target signal is 1 or 2. The layer quantity of data of an interference signal is 1 or 2.

The indication information further includes: a DMRS port used by a target terminal.

The indication of the interference presence ID and the modulation order information used by the interference signal refers to the foregoing embodiments.

The joint coding indicating DMRS information of the interference terminal and DMRS information of the target terminal is as shown in Tables 9.1 to 9.2 or as shown in Tables 9.1 and 9.3.

TABLE 9.1

Joint coding of DMRS information of Interference terminal and DMRS information of Target terminal (single codeword stream is enabled) (overhead is 3 bit)

| Value | Message |
|---|---|
| 0 | Target signal is 1 layer, port 7; Interfernece signal is 1 layer, port 8; |
| 1 | Target signal is 1 layer, port 8; Interfernece signal is 1 layer, port 7; |
| 2 | Target signal is 1 layer, port 11; Interfernece signal is 1 layer, port 7&8; |
| 3 | Target signal is 2 layer, port 7; Interfernece signal is 2 layer, port 11&13; |
| 4 | Target signal is 2 layer, port 7&8; Interfernece signal is 2 layer, port 11&13; |
| 5 | Target signal is 2 layer, port 7&8; Interfernece signal is 2 layer, port 11; |
| 6 | Target signal is 2 layer, port 11&13; Interfernece signal is 2 layer, port 7&8; |
| 7 | Target signal is 2 layer, port 11&13; Interfernece signal is 2 layer, port 7; |

The port in Table 9.2 refers to a DMRS port, and the SCID may be set as needed. The nSCID of a target user and the nSCID of an interference user are the same or different; the nSCID is an agreed value, such as, fixed to 0 or 1 in an interference scene.

TABLE 9.2

Joint coding of DMRS information of Interference terminal and DMRS information of Target terminal (double codeword stream is enabled) (overhead is 3 bit)

| Value | Message |
|---|---|
| 0 | Target signal is 2 layer, port 7&8; Interference signal is 2 layer, port 11&13; |
| 1 | Target signal is 2 layer, port 11&13; Interference signal is 2 layer, port 7&8; |
| 2 | Target signal is 2 layer, port 7&8; Interference signal is 2 layer, port 11; |
| 3 | Target signal is 2 layer, port 11&13; Interference signal is 2 layer, port 7; |
| 4-7 | Reserved |

The port in Table 9.2 refers to a DMRS port, and the SCID may be set as needed. The nSCID of a target user and the nSCID of an interference user are the same or different; the nSCID is an agreed value, such as, fixed to 0 or 1 in an interference scene.

TABLE 9.3

Joint coding of DMRS information of Interference terminal and DMRS information of Target terminal (two codeword streams are enabled) (overhead is 3 bit)

| Value | Message |
|---|---|
| 0 | Target signal is 2 layer, port 7&8; $n_{SCID\_0}$ Interference signal is 2 layer, port 11&13; $n_{SCID\_0}$ |
| 1 | Target signal is 2 layer, port 11&13; $n_{SCID\_0}$ Interference signal is 2 layer, port 7&8; $n_{SCID\_0}$ |
| 2 | Target signal is 2 layer, port 11&13; $n_{SCID\_0}$ Interference signal is 1 layer, port 7; $n_{SCID\_0}$ |
| 3 | Target signal is 2 layer, port 7&8; $n_{SCID\_0}$ Interference signal is 1 layer, port 11; $n_{SCID\_0}$ |
| 4 | Target signal is 2 layer, port 7&8; $n_{SCID\_1}$ Interference signal is 2 layer, port 11&13; $n_{SCID\_1}$ |
| 5 | Target signal is 2 layer, port 11&13; $n_{SCID\_1}$ Interference signal is 2 layer, port 7&8; $n_{SCID\_1}$ |
| 6 | Target signal is 2 layer, port 11&13; $n_{SCID\_1}$ Interference signal is 1 layer, port 7; $n_{SCID\_1}$ |
| 7 | Target signal is 2 layer, port 7&8; $n_{SCID\_1}$ Interference signal is 1 layer, port 11; $n_{SCID\_1}$ |

At operation 902, the indication information is sent to the target terminal to enable the target terminal to cancel interference based on the indication information during data reception of multi-user superposition.

Embodiment 10

DMRS port information of a target terminal is shown in Tables 10.1 and 10.2.

TABLE 10.1

DMRS port information of Target terminal (single codeword stream is enabled) (overhead is 3 bit)

| Value | Message |
|---|---|
| 0 | Target signal is 1 layer, port 7, $n_{SCID} = 0$ |
| 1 | Target signal is 1 layer, port 7, $n_{SCID} = 1$; |
| 2 | Target signal is 1 layer, port 8, $n_{SCID} = 0$; |
| 3 | Target signal is 1 layer, port 8, $n_{SCID} = 1$; |
| 4 | Target signal is 2 layer, port 7&8, $n_{SCID} = 0$; |
| 5 | Target signal is 2 layer, port 7&8, $n_{SCID} = 1$; |
| 6 | Target signal is 2 layer, port 11&13, $n_{SCID} = 0$; |
| 7 | Target signal is 2 layer, port 11&13, $n_{SCID} = 1$; |

TABLE 10.2

DMRS port information of Target terminal (two codeword streams are enabled) (overhead is 2 bit)

| Value | Message |
|---|---|
| 0 | 2 layer, port 7&8, $n_{SCID} = 0$; |
| 1 | 2 layer, port 7&8, $n_{SCID} = 1$; |
| 2 | 2 layer, port 11&13, $n_{SCID} = 0$; |
| 3 | 2 layer, port 11&13, $n_{SCID} = 1$; |

Embodiment 11

Figure 9:
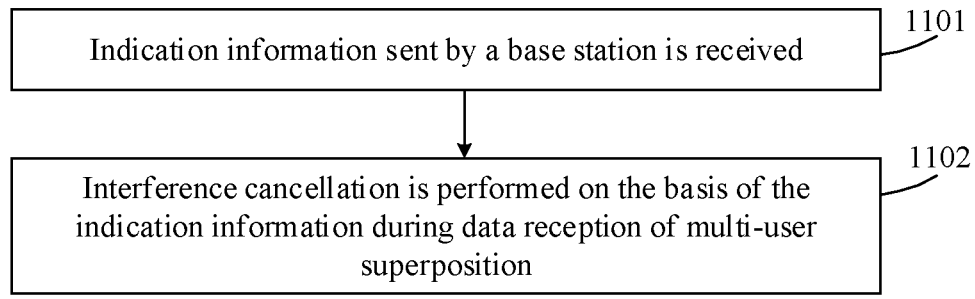
FIG. 9 is a ninth schematic flowchart of an information transmission method according to an embodiment of the disclosure.

FIG. 9 is a schematic flowchart of an information transmission method according to an embodiment of the disclosure. The method is applied to a target terminal. As shown in FIG. 9, the information transmission method according to an embodiment of the disclosure includes the operations as follows.

At operation 1101, indication information sent by a base station is received.

Here, the indication information may separately indicate a certain piece of information by means of independent coding or joint coding, or jointly indicate multiple pieces of information by means of independent coding and joint coding, and the indication information includes at least one of the following:

a data transmission mode, a DMRS port used by an interference terminal, precoding information used by an interference signal, PRB granularity used by MUST, layer quantity of target signal data, a sequence number of a layer where the interfered target signal data is located, and a DMRS port used by a target terminal.

Here, it is to be noted that the indication information in the present embodiment is the same as the indication information described in the first embodiment, and details are not repeated herein.

In the embodiment, the indication information includes a storage sequence number of a PMI used by the interference signal.

Correspondingly, after indication information sent by a base station is received, the method further includes the operations as follows.

The target terminal acquires a PMI used by a target signal, a rank used by the target signal and a first information comparison table used by the target signal.

The first information comparison table is searched for based on a storage sequence number of a PMI used by an interference signal, the PMI used by the target signal and the rank used by the target signal, so as to obtain the PMI used by the interference signal.

Here, the first information comparison table is a table of comparison between a storage sequence number of a PMI used by an interference signal and the PMI used by the interference signal.

In the embodiment, the indication information includes: a data transmission mode and a DMRS port used by a target terminal, wherein the data transmission mode is a MUST mode.

Correspondingly, after indication information sent by a base station is received, the method further includes the operations as follows.

The DMRS port used by the target terminal in the indication information is acquired, and a DMRS port used by an interference terminal is obtained according to the DMRS port used by the target terminal.

At operation 1102, interference cancellation is performed based on the indication information during data reception of multi-user superposition.

The process in which the target terminal performs interference cancellation based on the indication information after acquiring the indication information during data reception of multi-user superposition belongs to the existing art, and details are not repeated herein.

By applying the above embodiment of the disclosure, a target terminal receives indication information sent by a base station and required for interference cancellation, so as to perform interference information cancellation based on the indication information during data reception of multi-user superposition. Based on actual characteristics of a MUST technology, the redundant information is removed as much as possible to reduce the overhead of the transmission information. The interference cancellation performance of a MUST system is improved by transmitting downlink MUST parameter information while maintaining little influence on the existing LTE signaling.

Embodiment 12

Figure 10:
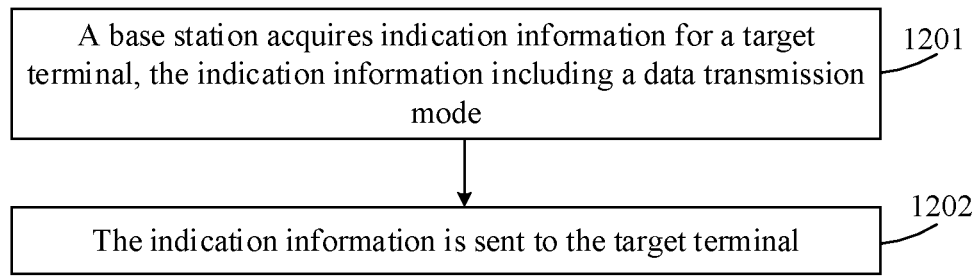
FIG. 10 is a tenth schematic flowchart of an information transmission method according to an embodiment of the disclosure.

FIG. 10 is a schematic flowchart of an information transmission method according to an embodiment of the disclosure. As shown in FIG. 10, the information transmission method according to an embodiment of the disclosure includes the operations as follows.

At operation 1201, a base station acquires indication information for a target terminal, the indication information including a data transmission mode.

Here, the indication information is used for the target terminal to perform interference cancellation based on the indication information during data reception of multi-user superposition.

In the embodiment of the disclosure, the indication information includes only a data transmission mode, and the data transmission mode is indicated by using an independent coding manner, where the indication information is 1 bit.

According to actual needs, when the bit value of the indication information is 1, the transmission mode from the base station to the target terminal is MUST.

When the bit value of the indication information is 0, the transmission mode from the base station to the target terminal is non-MUST.

Of course, when the bit value of the indication information is 0, the transmission mode from the base station to the target terminal may be set as MUST.

When the bit value of the indication information is 1, the transmission mode from the base station to the target terminal is non-MUST.

At operation 1202, the indication information is sent to the target terminal.

In the present embodiment, a base station uses a small overhead to indicate a transmission mode, and a target terminal directly obtains the transmission mode of target signal data by using the indication information sent by the base station, and further knows that in the case that the transmission mode is MUST, the redundant interference information is eliminated as much as possible.

Embodiment 13

Figure 11:
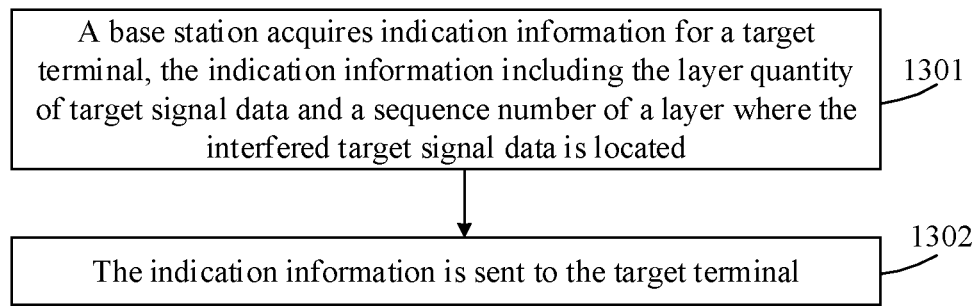
FIG. 11 is an eleventh schematic flowchart of an information transmission method according to an embodiment of the disclosure.

FIG. 11 is a schematic flowchart of an information transmission method according to an embodiment of the disclosure. As shown in FIG. 11, the information transmission method according to an embodiment of the disclosure includes the operations as follows.

At operation 1301, a base station acquires indication information for a target terminal, the indication information including layer quantity of target signal data and a sequence number of a layer where the interfered target signal data is located.

Here, the indication information is used for the target terminal to perform interference cancellation based on the indication information during data reception of multi-user superposition.

In the embodiment of the disclosure, the indication information includes 2 layers of target signal data and a sequence number of the layer where the interfered target signal data is located, and the information is indicated by means of joint coding, where the overhead of the indication information is 2 bits.

According to actual needs, when the value of the first bit of the indication information is 1, it is indicated that the first layer signal of the target signal is interfered by other signals.

When the value of the first bit of the indication information is 0, it is indicated that the first layer signal of the target signal is not interfered by other signals.

When the value of the second bit of the indication information is 1, it is indicated that the second layer signal of the target signal is interfered by other signals.

When the value of the second bit of the indication information is 0, it is indicated that the second layer signal of the target signal is not interfered by other signals.

Or, when the value of the first bit of the indication information is 0, it is indicated that the first layer signal of the target signal is interfered by other signals.

When the value of the first bit of the indication information is 1, it is indicated that the first layer signal of the target signal is not interfered by other signals.

When the value of the second bit of the indication information is 0, it is indicated that the second layer signal of the target signal is interfered by other signals.

When the value of the second bit of the indication information is 1, it is indicated that the second layer signal of the target signal is not interfered by other signals.

At operation 1302, the indication information is sent to the target terminal.

In the present embodiment, a base station uses a small overhead to indicate layer quantity of target signal data and a sequence number of a layer where the interfered target signal data is located, and a target terminal directly obtains layer quantity of the target signal data and the sequence number of the layer where the interfered target signal data is located by using the indication information sent by the base station, and further eliminates the redundant interference information as much as possible, thereby effectively improving the interference cancellation performance of a system.

Embodiment 14

FIG. 12 is a schematic flowchart of an information transmission method according to an embodiment of the disclosure. As shown in FIG. 12, the information transmission method according to an embodiment of the disclosure includes the operations as follows.

At operation 1401, a base station acquires indication information for a target terminal, the indication information including a data transmission mode, layer quantity of target signal data and a sequence number of a layer where the interfered target signal data is located.

Here, the indication information is used for the target terminal to perform interference cancellation based on the indication information during data reception of multi-user superposition.

In the embodiment of the disclosure, the indication information includes a data transmission mode, 2 layers of target signal data and a sequence number of the layer where the interfered target signal data is located, where the overhead of the indication information is 2 bits.

According to actual needs, when the value of the first bit of the indication information is 0, it is indicated that the first layer signal of the target signal is interfered by other signals, and when the value is 1, it is indicated that the first layer signal of the target signal is not interfered by other signals.

When the value of the second bit of the indication information is 0, it is indicated that the second layer signal of the target signal is interfered by other signals; and when the value is 1, it is indicated that the second layer signal of the target signal is not interfered by other signals.

When the value of the first bit of the indication information or the value of the second bit is 0, it is indicated that the data transmission mode from the base station to the target terminal is MUST.

When the value of the first bit and the value of the second bit of the indication information are both 1, it is indicated that the data transmission mode from the base station to the target terminal is non-MUST.

At operation 1402, the indication information is sent to the target terminal.

In the present embodiment, a base station uses a small overhead to indicate a data transmission mode, layer quantity of target signal data and a sequence number of a layer where the interfered target signal data is located, and a target terminal directly obtains the above information by using the indication information sent by the base station, and further eliminates the redundant interference information as much as possible in the case of MUST, thereby effectively improving the interference cancellation performance of a system.

Embodiment 15

FIG. 13 is a schematic flowchart of an information transmission method according to an embodiment of the disclosure. As shown in FIG. 13, the information transmission method according to an embodiment of the disclosure includes the operations as follows.

At operation 1501, a base station acquires indication information for a target terminal, the indication information including layer quantity of target signal data, a sequence number of a layer where the interfered target signal data is located, and a DMRS port used by the target terminal.

Here, the indication information is used for the target terminal to perform interference cancellation based on the indication information during data reception of multi-user superposition.

In the present embodiment, the overhead of the indication information is 2 bits, and different bit values correspond to different information contents, specifically as shown in Table 1.

TABLE 1

| Bit value | Indicated information content |
| --- | --- |
| 0 | 2 layers of data, sequence numbers of DMRS ports are 7 and 8, and the first and second layers of data are interfered |
| 1 | 2 layers of data, sequence numbers of DMRS ports are 7 and 8, and the first layer of data is interfered |
| 2 | 2 layers of data, sequence numbers of DMRS ports are 7 and 8, and the second layer of data is interfered |
| 3 | 2 layers of data, sequence numbers of DMRS ports are 7 and 8, and the first and second layers of data are not interfered |
| 4 | 1 layer of data, sequence numbers of DMRS ports are 7 and 8, and the first and second layers of data are not interfered |
| 5 | 1 layer of data, and a sequence number of a DMRS port is 7 |
| 6 | 1 layer of data, and a sequence number of a DMRS port is 8 |
| 7 | Reserved |

At operation 1502, the indication information is sent to the target terminal.

Embodiment 16

FIG. 14 is a schematic flowchart of an information transmission method according to an embodiment of the disclosure. As shown in FIG. 14, the information transmission method according to an embodiment of the disclosure includes the operations as follows.

At operation 1601, a base station acquires indication information for a target terminal, the indication information including a DMRS port used by an interference terminal.

In the present embodiment, the overhead of the indication information is 2 bits.

When the first bit value of the indication information is 0 and the second bit value is 0, the indication information indicates that the DMRS port number used by the interference terminal is 7.

When the first bit value of the indication information is 0 and the second bit value is 1, the indication information indicates that the DMRS port number used by the interference terminal is 8.

When the first bit value of the indication information is 1 and the second bit value is 0, the indication information indicates that the DMRS port number used by the interference terminal is 9.

When the first bit value of the indication information is 1 and the second bit value is 1, the indication information indicates that the DMRS port number used by the interference terminal is 10.

Here, it is to be noted that different information indications may be performed by using the above coding indication mode. For example, when the indication information includes a PMI used by an interference signal, the following manner may be used to perform the following setting:

in the embodiment, the number of transmitting antenna ports of the base station is 2;

when the first bit value of the indication information is 0 and the second bit value is 0, the indication information indicates that the PMI used by the interference signal is 0;

when the first bit value of the indication information is 0 and the second bit value is 1, the indication information indicates that the PMI used by the interference signal is 1;

when the first bit value of the indication information is 1 and the second bit value is 0, the indication information indicates that the PMI used by the interference signal is 2;

when the first bit value of the indication information is 1 and the second bit value is 1, the indication information indicates that the PMI used by the interference signal is 3.

Or, when the indication information includes a storage sequence number of the PMI used by the interference signal, the following manner may be used to perform the following setting:

when the first bit value of the indication information is 0 and the second bit value is 0, the indication information indicates that the storage sequence number of the PMI used by the interference signal is 0 (or 1);

when the first bit value of the indication information is 0 and the second bit value is 1, the indication information indicates that the storage sequence number of the PMI used by the interference signal is 1 (or 2);

when the first bit value of the indication information is 1 and the second bit value is 0, the indication information indicates that the storage sequence number of the PMI used by the interference signal is 2 (or 3);

when the first bit value of the indication information is 1 and the second bit value is 1, the indication information indicates that the storage sequence number of the PMI used by the interference signal is 3 (or 4).

At operation 1602, the indication information is sent to the target terminal.

Embodiment 17

Figure 15:
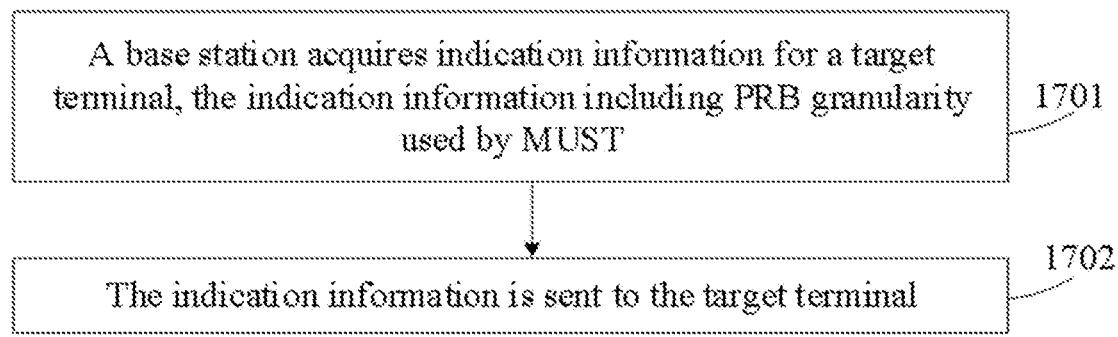
FIG. 15 is a fifteenth schematic flowchart of an information transmission method according to an embodiment of the disclosure.

FIG. 15 is a schematic flowchart of an information transmission method according to an embodiment of the disclosure. As shown in FIG. 15, the information transmission method according to an embodiment of the disclosure includes the operations as follows.

At operation 1701, a base station acquires indication information for a target terminal, the indication information including PRB granularity used by MUST.

Here, the indication information is used for the target terminal to perform interference cancellation based on the indication information during data reception of multi-user superposition.

In the present embodiment, the overhead of the indication information is 2 bits. In practical applications, the following setting may be performed:

when the first bit value of the indication information is 0 and the second bit value is 0, the indication information indicates that the PRB granularity used by MUST is full bandwidth, as shown in FIG. 16*a*;

when the first bit value of the indication information is 0 and the second bit value is 1, the indication information indicates that the PRB granularity used by MUST is a sub-band predetermined by a system, as shown in FIG. 16*b*;

when the first bit value of the indication information is 1 and the second bit value is 0, the indication information indicates that the PRB granularity used by MUST is 1, as shown in FIG. 16*c*;

when the first bit value of the indication information is 1 and the second bit value is 1, the indication information indicates that the PRB granularity used by MUST is 2, as shown in FIG. 16*d*.

At operation 1702, the indication information is sent to the target terminal.

Embodiment 18

FIG. 17 is a schematic flowchart of a method for a target terminal to acquire a PMI used by an interference signal according to an embodiment of the disclosure. As shown in FIG. 17, the method for acquiring a PMI used by an interference signal by a target terminal according to an embodiment of the disclosure includes the operations as follows.

At operation 1801, a PMI used by a target signal, a rank used by the target signal, a storage sequence number of a PMI used by an interference signal, and a first information comparison table used by the target signal are acquired.

In the present embodiment, the number of transmitting antennas is $4T_X$; based on transmission data of a CRS port, the PMI used by the target signal is a precoding weight number $p_2$ used by the target signal, the rank used by the target signal is $r_2$, the storage sequence number of the PMI used by the interference signal is $1_M$, and the first information comparison table includes Table A1 and Table A2.

At operation 1802, the first information comparison table is searched for based on a storage sequence number of a PMI used by an interference signal, the PMI used by the target signal and the rank used by the target signal, so as to obtain the PMI used by the interference signal.

In the present embodiment, the present operation includes:

first, Table A1 or Table A2 is determined to be searched for in Table A according to the rank $r_2$ used by the target signal;

second, according to the precoding weight number $p_2$ used by the target signal, a PMI sequence L used by the interference signal used by the row is found;

then, according to the storage sequence number $1_M$ indicated by the indication information, the $1_M$th PMI in the sequence L is found as the precoding sequence number PMI used by the interference signal.

Table A1 is a codeword pairing situation table with rank 1 and Table A2 is a codeword pairing situation table with rank 2, which are shown as follows.

TABLE A1

| PMI used by target signal | PMI used by interference signal |
|---|---|
| 0 | 0, 9, 11 |
| 1 | 1, 8, 10 |
| 2 | 2, 9, 11 |
| 3 | 3, 8, 10 |
| 4 | 4 |
| 5 | 5 |
| 6 | 6 |
| 7 | 7 |
| 8 | 1, 3, 8 |
| 9 | 0, 2, 9 |
| 10 | 1, 3, 10 |
| 11 | 0, 2, 11 |
| 12 | 12 |
| 13 | 13 |
| 14 | 14 |
| 15 | 15 |

TABLE A2

| PMI used by target signal | PMI used by interference signal |
|---|---|
| 0 | 0, 1, 3, 9 |
| 1 | 0, 1, 2, 8 |
| 2 | 1, 2, 3, 9 |
| 3 | 0, 2, 3, 8 |
| 4 | 4, 5, 7 |
| 5 | 4, 5 |
| 6 | 6 |
| 7 | 4, 7 |
| 8 | 1, 3, 8, 9 |
| 9 | 0, 2, 8, 9 |
| 10 | 10 |
| 11 | 11 |
| 12 | 12 |
| 13 | 13 |
| 14 | 14 |
| 15 | 15 |

In each row of Table A1, an angle between a codeword indicated by the PMI used by the target signal and a codeword indicated by the PMI used by the interference signal is less than or equal to 45 degrees.

In each row of Table A2, an angle between a codeword indicated by the PMI used by the target signal and a codeword indicated by the PMI used by the interference signal is less than or equal to 45 degrees.

Embodiment 19

FIG. 18 is a composition structure diagram of an information transmission device according to an embodiment of the disclosure. The device is located on a base station. As shown in FIG. 18, the information transmission device according to an embodiment of the disclosure includes: an acquisition module 131 and a sending module 132.

The acquisition module 131 is configured to acquire indication information for a target terminal.

The sending module 132 is configured to send the indication information to the target terminal to enable the target terminal to cancel interference based on the indication information during data reception of multi-user superposition.

Here, the indication information may separately indicate a certain piece of information by means of independent coding or joint coding, or jointly indicate multiple pieces of information by means of independent coding and joint coding, and the indication information includes at least one of the following:

a data transmission mode, a sequence number of a DMRS port used by an interference terminal, a rank used by an interference signal, precoding information used by the interference signal, PRB granularity used by MUST, layer quantity of target signal data, and a sequence number of a layer where the interfered target signal data is located.

The precoding information used by the interference signal is: a PMI used by the interference signal, or a storage sequence number of the PMI used by the interference signal; the PMI used by the interference signal is a non-negative integer; and the storage sequence number of the PMI used by the interference signal is a non-negative integer.

The data transmission mode includes: a MUST mode and a non-MUST mode.

Here, it is to be noted that the indication information in the present embodiment is the same as the indication information described in the first method embodiment, and details are not repeated herein.

In the embodiment, the indication information includes a storage sequence number of a PMI used by the interference signal.

Correspondingly, the acquisition module 131 is further configured to: acquire a PMI used by a target signal, a rank used by the target signal, a PMI used by an interference signal, a rank used by the interference signal, and a first information comparison table used by the interference signal; and search for the first information comparison table based on the PMI used by the target signal, the rank used by the target signal, the PMI used by the interference signal and the rank used by the interference signal, so as to obtain a storage sequence number of the PMI used by the interference signal.

In the embodiment, the acquisition module is further configured to determine, when the data transmission mode is MUST, that the DMRS port used by the target terminal is a first port and the DMRS port used by the interference terminal is a second port according to a predetermined criterion, and send data based on the first port and the second port.

The DMRS port used by the target terminal is one-to-one mapping with the DMRS port used by the interference terminal.

Specifically, the acquisition module is further configured to:

when there is one DMRS port used by the target terminal and there is one DMRS port used by the interference terminal, determine that the DMRS port number used by the target terminal is 7 and the DMRS port number used by the interference terminal is 8 according to a predetermined criterion;

or, determine that the DMRS port number used by the target terminal is 7 and the DMRS port number used by the interference terminal is 9 according to a predetermined criterion;

or, determine that the DMRS port number used by the target terminal is 7 and the DMRS port number used by the interference terminal is 10 according to a predetermined criterion;

or, determine that the DMRS port number used by the target terminal is 8 and the DMRS port number used by the interference terminal is 7 according to a predetermined criterion;

or, determine that the DMRS port number used by the target terminal is 8 and the DMRS port number used by the interference terminal is 9 according to a predetermined criterion;

or, determine that the DMRS port number used by the target terminal is 8 and the DMRS port number used by the interference terminal is 10 according to a predetermined criterion;

when there are two DMRS ports used by the target terminal and there are two DMRS ports used by the interference terminal, determine that the sequence numbers of the DMRS ports used by the target terminal are 7 and 8 and the sequence numbers of the DMRS ports used by the interference terminal are 7 and 8 according to a predetermined criterion;

or, determine that the sequence numbers of the DMRS ports used by the target terminal are 7 and 8 and the sequence numbers of the DMRS ports used by the interference terminal are 9 and 10 according to a predetermined criterion;

or, determine that the sequence numbers of the DMRS ports used by the target terminal are 7 and 9 and the sequence numbers of the DMRS ports used by the interference terminal are 8 and 10 according to a predetermined criterion;

or, determine that the sequence numbers of the DMRS ports used by the target terminal are 8 and 10 and the sequence numbers of the DMRS ports used by the interference terminal are 7 and 9 according to a predetermined criterion;

when there are two DMRS ports used by the target terminal and there is one DMRS port used by the interference terminal, determine that the sequence numbers of the DMRS ports used by the target terminal are 7 and 8 and the DMRS port number used by the interference terminal is 7 according to a predetermined criterion;

or, determine that the sequence numbers of the DMRS ports used by the target terminal are 7 and 8 and the DMRS port number used by the interference terminal is 8 according to a predetermined criterion;

or, determine that the sequence numbers of the DMRS ports used by the target terminal are 7 and 8 and the DMRS port number used by the interference terminal is 9 according to a predetermined criterion;

or, determine that the sequence numbers of the DMRS ports used by the target terminal are 7 and 8 and the DMRS port number used by the interference terminal is 10 according to a predetermined criterion;

or, determine that the sequence numbers of the DMRS ports used by the target terminal are 7 and 9 and the DMRS port number used by the interference terminal is 8 according to a predetermined criterion;

or, determine that the sequence numbers of the DMRS ports used by the target terminal are 7 and 9 and the DMRS port number used by the interference terminal is 10 according to a predetermined criterion;

or, determine that the sequence numbers of the DMRS ports used by the target terminal are 8 and 10 and the DMRS port number used by the interference terminal is 7 according to a predetermined criterion;

or, determine that the sequence numbers of the DMRS ports used by the target terminal are 8 and 10 and the DMRS port number used by the interference terminal is 9 according to a predetermined criterion;

or, determine that the sequence numbers of the DMRS ports used by the target terminal are 9 and 10 and the DMRS port number used by the interference terminal is 7 according to a predetermined criterion;

or, determine that the sequence numbers of the DMRS ports used by the target terminal are 9 and 10 and the DMRS port number used by the interference terminal is 8 according to a predetermined criterion;

or, determine that the sequence numbers of the DMRS ports used by the target terminal are 9 and 10 and the DMRS port number used by the interference terminal is 9 according to a predetermined criterion;

or, determine that the sequence numbers of the DMRS ports used by the target terminal are 9 and 10 and the DMRS port number used by the interference terminal is 10 according to a predetermined criterion.

Embodiment 20

Figure 19:
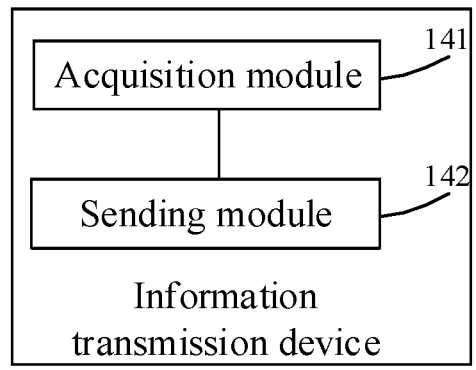
FIG. 19 is a second composition structure diagram of an information transmission device according to an embodiment of the disclosure.

FIG. 19 is a composition structure diagram of an information transmission device according to an embodiment of the disclosure. The device is located on a base station. As shown in FIG. 19, the information transmission device according to an embodiment of the disclosure includes: an acquisition module 141 and a sending module 142.

The acquisition module 141 is configured to acquire indication information for a target terminal.

The sending module 142 is configured to send the indication information to the target terminal to enable the target terminal to cancel interference based on the indication information during data reception of multi-user superposition.

The indication information is: a DMRS port used by an interference terminal, and a modulation order used by an interference signal.

The implementation of the DMRS port used by the interference terminal is described as same as that in Embodiment 16.

Embodiment 21

Figure 20:
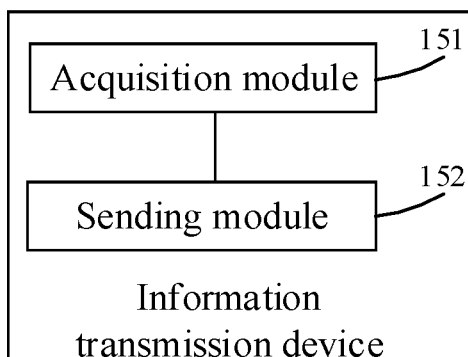
FIG. 20 is a third composition structure diagram of an information transmission device according to an embodiment of the disclosure.

FIG. 20 is a composition structure diagram of an information transmission device according to an embodiment of the disclosure. The device is located on a base station. As shown in FIG. 20, the information transmission device according to an embodiment of the disclosure includes: an acquisition module 151 and a sending module 152.

The acquisition module 151 is configured to acquire indication information for a target terminal.

The sending module 152 is configured to send the indication information to the target terminal to enable the target terminal to cancel interference based on the indication information during data reception of multi-user superposition.

The indication information is a modulation order used by an interference signal.

Embodiment 22

Figure 21:
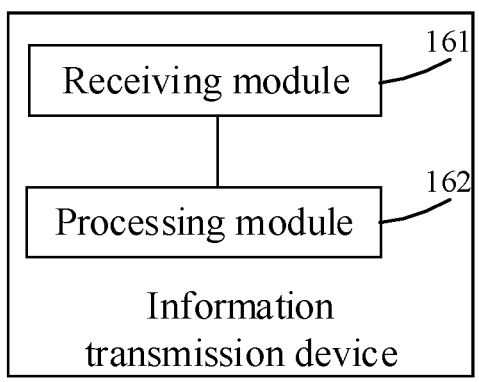
FIG. 21 is a fourth composition structure diagram of an information transmission device according to an embodiment of the disclosure.

FIG. 21 is a composition structure diagram of an information transmission device according to an embodiment of the disclosure. The device is located on a target terminal. As shown in FIG. 21, the information transmission device according to an embodiment of the disclosure includes a receiving module 161 and a processing module 162.

The receiving module 161 is configured to receive indication information sent by a base station.

The processing module 162 is configured to perform interference cancellation based on the indication information during data reception of multi-user superposition.

Here, the indication information may separately indicate a certain piece of information by means of independent coding or joint coding, or jointly indicate multiple pieces of information by means of independent coding and joint coding, and the indication information includes at least one of the following:

a data transmission mode, a DMRS port used by an interference terminal, precoding information used by an interference signal, PRB granularity used by MUST, layer quantity of target signal data, a sequence number of a layer where the interfered target signal data is located, and a DMRS port used by a target terminal.

The precoding information used by the interference signal is: a PMI used by the interference signal, or a storage sequence number of the PMI used by the interference signal.

The data transmission mode includes a MUST mode and a non-MUST mode.

Here, it is to be noted that the indication information in the present embodiment is the same as the indication information described in the first method embodiment, and details are not repeated herein.

In the embodiment, the indication information includes a storage sequence number of a PMI used by the interference signal.

Correspondingly, the processing module 162 is further configured to:

acquire a PMI used by a target signal, a rank used by the target signal, and a first information comparison table used by the target signal; and search for the first information comparison table based on a storage sequence number of a PMI used by an interference signal, the PMI used by the target signal and the rank used by the target signal, so as to obtain the PMI used by the interference signal.

In the embodiment, the indication information includes: a data transmission mode and a DMRS port used by a target terminal, wherein the data transmission mode is a MUST mode.

Correspondingly, the processing module 162 is further configured to acquire the DMRS port number used by the target terminal in the indication information, and obtain a DMRS port used by an interference terminal according to the DMRS port used by the target terminal.

Embodiment 23

Figure 22:
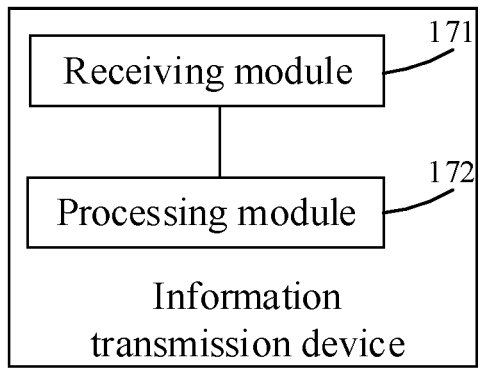
FIG. 22 is a fifth composition structure diagram of an information transmission device according to an embodiment of the disclosure.

FIG. 22 is a composition structure diagram of an information transmission device according to an embodiment of the disclosure. The device is located on a target terminal. As shown in FIG. 22, the information transmission device according to an embodiment of the disclosure includes: a receiving module 171 and a processing module 172.

The receiving module 171 is configured to receive indication information sent by a base station.

The processing module 172 is configured to perform interference cancellation based on the indication information during data reception of multi-user superposition. The indication information is: a DMRS port used by an interference terminal, and a modulation order used by an interference signal.

Embodiment 24

Figure 23:
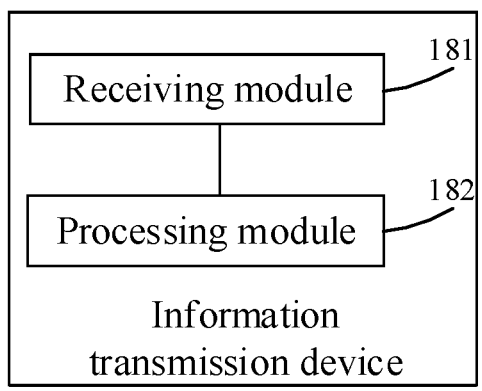
FIG. 23 is a sixth composition structure diagram of an information transmission device according to an embodiment of the disclosure.

FIG. 23 is a composition structure diagram of an information transmission device according to an embodiment of the disclosure. The device is located on a target terminal. As shown in FIG. 23, the information transmission device according to an embodiment of the disclosure includes: a receiving module 181 and a processing module 182.

The receiving module 181 is configured to receive indication information sent by a base station.

The processing module 182 is configured to perform interference cancellation based on the indication information during data reception of multi-user superposition.

The indication information is: a modulation order used by an interference signal.

In the information transmission device according to the embodiments of the disclosure, each module may be implemented by a Central Processing Unit (CPU) or a Digital Signal Processor (DSP), or a Field Programmable Gate Array (FPGA), or an Application Specific Integrated Circuit (ASIC) in a server or a terminal. Both the sending module and the receiving module may be implemented by an antenna system.

In the embodiment of the disclosure, the port is a DMRS port used by an interference terminal, the scrambling ID is a scrambling ID used by an interference signal, and layer quantity is the number of layer(s) of an interference signal data.

The modulation order used by the interference signal and the interference presence ID are indicated by joint coding.

The interference presence ID, the port, the scrambling ID and the layer quantity are indicated by joint coding.

If DMRS ports of the target terminal and the interference terminal are different, scrambling IDs of the target terminal and the interference terminal are set to be the same.

A set is predefined, and an element of the set is a Physical Downlink Shared Channel (PDSCH) power parameter; the PDSCH power parameter is a first type of PDSCH power parameter or a second type of PDSCH power parameter. DCI is used to indicate whether the first type of PDSCH power parameter or the second type of PDSCH power parameter is selected, and a transmitting power is determined according to the PDSCH power parameter. The PDSCH power parameter indicates a power of a synthesized symbol or a power of a component symbol of the synthesized symbol. A calculation mode is indicated by DCI, a PDSCH power parameter is calculated according to the indicated calculation mode, and a transmitting power is determined according to the calculated PDSCH power parameter. The calculation mode includes: a first type of calculation modes which is obtaining the PDSCH power parameter based on a PDSCH power where the synthesized symbol is located; and a second type of calculation modes which refers to obtaining the PDSCH power parameter based on a power of a component symbol of the synthesized symbol.

Here, it is to be noted that the above description of the devices is similar to the description of the above methods, and the effects achieved by the devices are as same as these of the methods, and thus are not repeated. For technical details not disclosed in the device embodiments of the disclosure, please refer to the description of the method embodiments of the disclosure.

The embodiment of the disclosure also provides an information transmission device. The information transmission device includes: a processor and a memory configured to store a computer program runnable on the processor.

The processor runs the computer program to perform the information transmission method according to the embodiment of the disclosure.

In the embodiment of the disclosure, if the above information transmission method is implemented in the form of a software function module and sold or used as a stand-alone product, it may also be stored in a non-transitory computer readable storage medium. Based on such understanding, the essence of the technical solution of the embodiments of the disclosure or a part contributing to the existing art may be embodied in the form of a software product that is stored in a non-transitory storage medium, including a plurality of instructions used to cause a computer device (which may be a personal computer, a server, or a network device, etc.) to perform all or part of the methods described in various embodiments of the disclosure. The foregoing non-transitory storage medium may include various media capable of storing program codes, such as a U disk, a mobile hard disk, a Read Only Memory (ROM), a magnetic disk, or an optical disc.

Correspondingly, an embodiment of the disclosure also provides a non-transitory computer storage medium having a computer program stored therein. The computer program is used to perform the information transmission method according to the embodiment of the disclosure.

The above is only the specific implementation manner of the disclosure, and the scope of protection of the disclosure is not limited thereto. Any changes or replacements that a person skilled in the art can easily think of within the technical scope disclosed by the disclosure shall be covered by the scope of protection of the disclosure. Therefore, the scope of protection of the disclosure shall be determined by the scope of the claims.

INDUSTRIAL APPLICABILITY

In the embodiments of the disclosure, a base station acquires indication information for a target terminal, and sends the indication information to the target terminal; and the target terminal receives the indication information from the base station, and cancels interference based on the indication information during data reception of multi-user superposition. Thus, the target terminal is enabled to receive information required for interference cancellation with less overhead. The interference cancellation performance of a MUST system is effectively improved while maintaining little influence on the existing LTE signaling.

The invention claimed is:
1. A method for information transmission, comprising:
acquiring indication information for a target terminal; and
sending the indication information to the target terminal,
wherein the indication information comprises:
an interference presence Identification (ID);
a modulation order of an interference signal; and
a Demodulation Reference Signal (DMRS) port used by an interference terminal or a DMRS port used by a target terminal;
wherein the interference presence ID and the modulation order of the interference signal are indicated jointly;
wherein the DMRS port used by the interference terminal is acquired according to the DMRS port used by the target terminal.

2. The method according to claim 1, further comprising:
responsive to that a data transmission mode is MUST, determining according to a predetermined criterion that a DMRS port used by the target terminal is a first port and a DMRS port used by an interference terminal is a second port, and sending data based on the first port and the second port,
wherein the DMRS port used by the target terminal is one-to-one mapping with the DMRS port used by the interference terminal.

3. The method according to claim 2, wherein determining according to the predetermined criterion that the DMRS port used by the target terminal is the first port and the DMRS port used by the interference terminal is the second port comprises:
responsive to that there is one DMRS port used by the target terminal and there is one DMRS port used by the interference terminal, determining that a DMRS port number used by the target terminal is 7 and a DMRS port number used by the interference terminal is 8;
or, determining that a DMRS port number used by the target terminal is 8 and a DMRS port number used by the interference terminal is 7.

4. A non-transitory computer storage medium, having a computer executable instruction stored therein, the computer executable instruction being used to perform the information transmission method according to claim 1.

5. An information transmission device, comprising: a processor and a memory configured to store a computer program runnable on the processor, wherein
the processor is configured to, when running the computer program, perform the information transmission method according to claim 1.

6. The method of claim 1, wherein overhead of the indication information is 4 bit, including 2 bit for the modulation order and 2 bit for joint coding of the interference presence ID and the DMRS port of the interference terminal.

7. A method for information transmission, comprising:
receiving indication information from a base station; and
cancelling interference based on the indication information during data reception of multi-user superposition, wherein the indication information comprises:
an interference presence Identification (ID);
a modulation order of an interference signal; and
a Demodulation Reference Signal (DMRS) port used by an interference terminal or a DMRS port used by a target terminal;
wherein the interference presence ID and the modulation order of the interference signal are indicated by joint coding;
the method further comprises:
acquiring the sequence number of the DMRS port used by the interference terminal according to the DMRS port used by the target terminal.

8. A non-transitory computer storage medium, having a computer executable instruction stored therein, the computer executable instruction being used to perform the information transmission method according to claim 7.

9. An information transmission device, comprising: a processor and a memory configured to store a computer program runnable on the processor, wherein the processor is configured to, when running the computer program, perform the information transmission method according to claim 7.

10. The method of claim 7, wherein acquiring the DMRS port used by the interference terminal according to the DMRS port used by the target terminal comprises:
responsive to that there is one DMRS port used by the target terminal and there is one DMRS port used by the interference terminal, the DMRS port used by the target terminal is 7 and the DMRS port used by the interference terminal is 8, or the DMRS port used by the target terminal is 8 and the DMRS port used by the interference terminal is 7.

11. A device for information transmission, located on a base station, comprising: an acquisition module and a sending module, wherein
the acquisition module is configured to acquire indication information for a target terminal; and
the sending module is configured to send the indication information to the target terminal, wherein the indication information comprises:
an interference presence Identification (ID);
a modulation order of an interference signal; and
a Demodulation Reference Signal (DMRS) port used by an interference terminal or a sequence number of a DMRS port used by a target terminal;
wherein the interference presence ID and the modulation order of the interference signal are indicated jointly;
wherein the DMRS port used by the interference terminal is acquired according to the DMRS port used by the target terminal.

12. The device according to claim 11, wherein the interference presence ID and the modulation order of the interference signal are indicated jointly.

13. The device according to claim 11, wherein the acquisition module is further configured to determine, responsive to that a data transmission mode is MUST, that a DMRS port used by the target terminal is a first port and a DMRS port used by an interference terminal is a second port according to a predetermined criterion, and to send data based on the first port and the second port,
wherein the DMRS port used by the target terminal is one-to-one mapping with the DMRS port used by the interference terminal.

14. The device according to claim 13, wherein the acquisition module is further configured to, responsive to that there is one DMRS port used by the target terminal and there is one DMRS port used by the interference terminal, determine that a DMRS port number used by the target terminal is 7 and a DMRS port number used by the interference terminal is 8 according to the predetermined criterion;
or, determine that a DMRS port number used by the target terminal is 8 and a DMRS port number used by the interference terminal is 7 according to the predetermined criterion.

15. The device according to claim 11, wherein when there is one layer of interference signal data, overhead of the indication information is 4 bit, including 2 bit for the modulation order and 2 bit for joint coding of the interference presence ID and the DMRS port of the interference terminal.

* * * * *